United States Patent [19]

Kopp et al.

[11] Patent Number: 5,698,101

[45] Date of Patent: Dec. 16, 1997

[54] HOLLOW FIBER MEMBRANES

[75] Inventors: Clinton V. Kopp, Castle Hill; Robert J. W. Streeton, Windsor; Paul S. Khoo, Northmead, all of Australia

[73] Assignee: Memtec Limited, South Windsor, Australia

[21] Appl. No.: 378,523

[22] Filed: Jan. 26, 1995

Related U.S. Application Data

[63] Continuation-in-part of Ser. No. 946,496, Dec. 8, 1992, abandoned, and Ser. No. 13,952, Feb. 5, 1993, Pat. No. 5,395,570, each is a continuation-in-part of Ser. No. 536,650, Jul. 9, 1990, Pat. No. 5,318,417, and Ser. No. 941,376, Sep. 4, 1992, Pat. No. 5,277,851, which is a continuation of Ser. No. 536,649, Jul. 9, 1990, abandoned.

[51] Int. Cl.$^6$ .................................................. B01D 33/21
[52] U.S. Cl. ........................ 210/500.23; 210/500.36; 210/500.27; 210/500.38; 210/500.42; 210/500.43; 210/500.29
[58] Field of Search ..................... 210/500.36, 500.23, 210/500.27, 500.4, 506, 500.29, 500.38, 500.42, 500.43

[56] References Cited

U.S. PATENT DOCUMENTS

| | | | |
|---|---|---|---|
| 4,931,186 | 6/1990 | Ford et al. | 210/636 |
| 5,139,529 | 8/1992 | Seita et al. | 623/66 |

*Primary Examiner*—Ana Fortuna
*Attorney, Agent, or Firm*—Waldron & Associates

[57] ABSTRACT

A hollow fiber membrane is produced having an outer surface, and inner surface enclosing a lumen, and a continuous network of interconnecting pores extending from the outer surface to the inner surface, wherein substantially all of the pores have an elongated dimension and a shortened dimension, the elongated dimension being oriented substantially parallel to the axis of the hollow fiber, wherein the ratio of the elongated dimension to the shortened dimension is substantially constant from the outer surface to the inner surface, and wherein the pores change shape to increase the shortened dimension in response to a high pressure differential imposed across the membrane by increasing fluid pressure within the lumen.

8 Claims, 10 Drawing Sheets

HOLLOW FIBER MEMBRANES

RELATED CASES

This Application is a Continuation-in-Part of Applicants' prior applications, Ser. No. 07/946,496, now abandoned which entered the National Stage in the United States under 35 U.S.C. 371 on Dec. 8, 1992, for POLYVINYLIDENE FLUORIDE MEMBRANE; and Ser. No. 08/013,952, now U.S. Pat. No. 5,395,570 which entered the National Stage in the United States under 35 U.S.C. 371 on Feb. 5, 1993, for EXTRUSION OF HOLLOW FIBER MEMBRANE, each of which is in turn a Continuation in Part of Ser. No. 07/536,650, which entered the National Stage in the United States under 35 U.S.C. 371 on Jul. 9, 1990 for EXTRUSION OF HOLLOW FIBER MEMBRANES, now U.S. Pat. No. 5,318,417; and of Ser. No. 07/941,376, which was filed on Sep. 4, 1992 and is now U.S. Pat. No. 5,277,851, and which was in turn a Continuation of Ser. No. 07/536,649, which entered the National Stage in the United States under 35 U.S.C. 371 on Jul. 9, 1990, now abandoned; the disclosures of each of the foregoing copending applications are hereby incorporated by reference.

TECHNICAL FIELD

The present invention relates of hollow fiber membranes, used in industrial filters, and the like, and to improved pore structures for such membranes to enhance their performance as filters.

BACKGROUND

Hollow fiber membranes have grown in importance for variety of uses in separatory procedures and the like, particularly in filtration. Use of such hollow fiber membranes is increasingly common, and a variety of such products are now commercially available, often as components in filter cartridges and the like. Such hollow fiber membranes are made of a diversity of polymer materials to suit the requirements of use in diverse operating environments.

As the usage of these materials and products have become more common, the limitations of the hollow fiber structure have grown equally well recognized. Among these problems is the difficulty in keeping the membranes clean and preventing debris from the filtration and related separatory procedures from coating the membrane surfaces and occluding or blocking the pores passing from the interior lumen to the surface. Such fouling is a considerable problem, inherent in the microstructure of such membranes generally and is particularly acute for the hollow fiber membrane structure.

While many traditional filter cleaning techniques, such as backwashing, can be employed with hollow fiber membranes, their effectiveness has proved to be limited.

PRIOR ART

A substantial body of prior art addresses the formation and use of hollow fiber membranes. A substantial number of prior art references are of record in the applications parent to the present invention. In the specific context of the invention disclosed and claimed herein, their relevance and materiality, with one exception, is limited to background showings of the general state of the art.

U.S. Pat. No. 4,115,492 of Mahoney et al., issued Sep. 19, 1978, and assigned to the Dow Chemical Co., produces hollow fiber membranes of polyethylene which are drawn both during spinning and after the polymer is precipitated. Mahoney et al. is the most relevant prior art know to the applicant.

The following prior art references are of record in the examination of the parent applications and are disclosed herein as showing the general state of the art. Each is less relevant to patentability of the invention of the claims herein than the foregoing Mahoney et al. patent, but may be helpful in conveying a full understanding of the invention to those of ordinary skill in the art.

| U.S. PATENT DOCUMENTS | | |
| --- | --- | --- |
| 3,017,238 | 1/1962 | Levine |
| 3,378,507 | 4/1968 | Sargent et al. |
| 3,423,491 | 1/1969 | McLain et al. |
| 4,020,230 | 4/1977 | Mahoney et al. |
| 4,110,153 | 8/1978 | Rechlicz et al. |
| 4,247,498 | 1/1981 | Castro |
| 4,248,924 | 2/1981 | Okita |
| 4,401,567 | 8/1983 | Shindo et al. |
| 4,444,716 | 4/1984 | Aoyagi et al. |
| 4,519,909 | 5/1985 | Castro |
| 4,564,488 | 1/1986 | Gerlach et al. |
| 4,594,207 | 6/1986 | Josefiak et al. |
| 4,666,607 | 5/1987 | Josefiak et al. |
| 4,708,799 | 11/1987 | Gerlach et al. |

| NON-U.S. PATENT DOCUMENTS | | |
| --- | --- | --- |
| 7284081 | 1/1982 | AU (Australia) |
| 601599 | 6/1988 | AU (Australia) |
| 8058487 | 6/1988 | AU (Australia) |
| 108601 | 5/1984 | EP (European Patent Office) |
| 180052 | 5/1986 | EP (European Patent Office) |
| 217698 | 4/1987 | EP (European Patent Office) |
| 3318180 | 8/1987 | DE (Germany) |
| 1452400 | 10/1976 | GB (United Kingdom) |
| 8602282 | 4/1986 | WO (World Intellectual Property Org) |

Porous polymeric structures having pores in the range of 0.01 to 10 microns are commonly used for microfiltration. Such membrane structures may be prepared from thermoplastic polymers using precipitation techniques and formed into various shapes including hollow fibers or flat sheets.

The thermal precipitation technique for membrane formation commences with the formation of a solution of a thermoplastic polymer in a solvent at an elevated temperature. The solution is then cooled and, at a specific temperature which depends on the polymer, the solvent, the concentration of the polymer in the-solvent and the rate of cooling, phase separation occurs and the liquid polymer separates from the solvent.

All practical precipitation methods follow the same general process which is reviewed by Smolders et al in Kolloid Z.u.Z. Polymere 43, 14–20 (1971). The article distinguishes between spinodal and binodal decomposition of a polymer solution.

Known precipitation methods of porous membrane formation depend on the liquid polymer separating from the solvent followed by cooling so that the solidified polymer can then be separated from the solvent. Whether the solvent is liquid or solid when if is removed from the polymer depends on the temperature at which the operation is conducted and the melting point of the solvent.

True solutions require that there be a solvent and a solute. The solvent constitutes a continuous phase, and the solute is distributed randomly in the solvent at a molecular level. Such a situation is almost unknown with polymer solutions. Long polymer chains tend to bend back on themselves and form temporary interactions or bonds with other polymer chains with which they come into contact. These interactions are continually forming and breaking, and new ones are formed. Polymer solutions are thus rarely true solutions but lie somewhere between true solutions and mixtures.

In many cases it is also difficult to state which is the solvent and which is the solute. In the art, it is accepted practice to call a mixture of polymer and solvent a solution if it is optically clear without obvious inclusions of either phase in the other. Phase separation is usually then taken to be that point where there is an optically detectable separation.

There is yet another case where the heated mixture of polymer, solvent, and other components if present, is neither a solution nor a mixture in the usual sense of the words. This is the case where a surface-active agent is present in sufficient concentration to form ordered structures such as micelles.

In U.S. Pat. No. 3,378,508, a polymer is heated with a solvent that is an anionic surfactant. The solution is then cooled and membrane formation results which is in accordance with the teachings of the spinodal decomposition technique. As the anionic surfactant solvent is a solid at room temperature, solvent removal is by removal of the solid surfactant from the pores.

U.S. Pat. No. 4,247,498 describes the use of the spinodal decomposition technique with slow cooling of the solution in relation to a wide range of polymers and solvents. According to U.S. Pat. No. 4,247,498, the slow cooling of the solution allows the solvent droplets to coalesce somewhat before the polymer freezes around them. As the solution is cooled, more and more solvent droplets are formed. Their rate of coalescence is governed by the rate of diffusion of solvent through the liquid polymer matrix. A longer time at a higher temperature allows a greater diffusion of the solvent. The slow cooling also affects the rate at which nuclei form in the polymer. The result is a membrane containing large cells interconnected by fine channels. The porous material of U.S. Pat. No. 4,247,498 is extruded into air to form a block having a skin over its surface.

U.S. Pat. No. 4,564,448 discloses a porous surface achieved by the technique of extruding the polymer solution into a bath of the solvent used forming the solution with the temperature of the bath being above the temperature where phase separation occurs.

UK Specification 2,115,425 discloses a spinodal decomposition technique with the modification that the solvent for the polymer is a mix of solvents, one of which is a very good solvent for the polymer and the other is a poor solvent. The ratio of the two solvents is adjusted to obtain a composite solvent that has the desired temperature related solvency effect for the polymer. Variation in the ratio of the two solvents affects the structure of the resultant membrane.

The process disclosed in above mentioned U.S. Pat. No. 3,378,508 consists of heating a mixture of a solid thermoplastic polymer of mono-ethylenically unsaturated hydrocarbons, and, a water-soluble anionic surfactant to a temperature where the polymer and surfactant are mutually soluble, cooling the mixture to a temperature where the polymer and surfactant form two intermingled separate phases, and, dissolving the surfactant phase from the polymer.

According to U.S. Pat. No. 3,378,508, the hydrocarbon and surfactant are mixed at elevated temperatures at which the two materials are mutually soluble to obtain a completely uniform distribution of the surfactant in the polymer. The specification discloses that any water soluble anionic surfactants and solid, thermoplastic polymers of mono-ethylenically unsaturated hydrocarbons form a homogeneous mixture at a temperature determined by the higher of either the melting point of the surfactant or the softening temperature of the polymer.

U.S. Pat. No. 3,378,507 details attempts made to incorporate into polyethylene non-ionic and cationic surfactants such as nonylphenoxypoly(oxyethylene) ethanol, polyoxyethylated fatty alcohols, polyoxyethylated fatty acids, polyoxyethylated vegetable oil, copolymers of polyoxyethylene and polyoxypropylene, polyethylene glycol ethers and mixed alkyl amine salts containing an average of 18 carbon atoms in the aklyl group.

The non-ionic surfactants were found to be incompatible with polyethylene and would not mix with polyethylene. Although the Cationic surfactants could be milled into the polyethylene, the cationic surfactant could not then be washed out by water, ethanol or other solvents.

Contrary to the teachings of U.S. Pat. No. 3,378,507, we have found that certain cationic and non-ionic surfactants can be used to form porous materials. For example, whereas the U.S. specification states that nonylphenoxypoly (oxyethylene) ethanol cannot be used, we have found that at least some of that class of surfactant can be used.

An influencing factor is the polarity of the cationic or non-ionic surfactant which can be described in relation to the hydrophilic-lipophilic balance of the surfactant. Within a certain hydrophilic-lipophilic balance range we have found that there is no restriction on the type of surfactant than can be used to form porous membranes from a polymeric solution.

A hollow fiber forming installation disclosed in U.S. Pat. No. 4,708,799 includes a vessel containing a heated solution of a polymer and a liquid which is inert relative to the polymer which is delivered to an extrusion die by a pump. The hollow fiber is extruded through a nozzle into a spinning tube containing inert liquid of the solution. The fiber and the inert liquid pass through an atmospheric gap to a spinning tube in the same direction and at substantially the same linear velocity.

In that installation, the hollow fiber is extruded in the molten state and formed in the spinning tube. The application of the inert liquid to the molten fiber has an adverse effect on the porosity of the surface of the fiber. Futhermore, the use of a spinning tube is cumbersome and costly.

PROBLEMS AND DIFFICULTIES IN THE ART

By the techniques of the prior art, the hollow fiber membranes may, in some cases, have pores which are elongated at the outer surface, but which are, by virtue of syneresis during the formation of the membrane, substantially circular within the depth of the membrane and at the inner surface of the membrane.

When such membranes are subjected to backwashing pressures, the circular pores resist stretching so that particles entrained in the pores are not removed. Since the entrainment of particles increases over time, the useful life of the membrane may be limited by the accumulation of debris within the pores.

In other cases, the circular pores may be stretched, by the use of higher pressure fluid backwashing operations, allowing the pores to release entrained particulate matter. Circular pores stretch by distention of the polymer material. Greatly improved backwashing and service life of the membrane should result.

In many circumstances, however, the stretching occurs inelastically, by cold plastic flow, and the pores are permanently enlarged. The polymers of greatest interest in the formation of such hollow fiber membranes generally have very low elasticity. As a consequence of permanent distention of the pores, the membrane loses its ability to retain particles of the required size because of the enlargement. Depending on the particular polymer of which the membrane is formed, the enlargement may be progressive, increasing the pore size to increasingly larger dimensions with successive backwash cycles.

In other, extreme circumstances, the circular pores resist inelastic stretching, in which cases, the backwashing pressure imposed on the pores may result in breakage of the polymer material and loss of the membrane integrity.

Mahoney et al. patent U.S. Pat. No. 4,115,492 disclosed that forming hollow fiber membranes can be drawn during the extrusion and after the polymer has fully precipitated to improve a number of physical properties. A close reading reveals, however, that Mahoney et al. do not control the procedure to produce the pore configuration required in the present invention. Mahoney et al. do not identify the pore shape of their product, either in the intermediate stage or in the final product after the fully formed hollow fiber is again drawn. The elongated pore structures of the present invention are not produced by the procedure of Mahoney et al., as the conditions of the hollow fiber extrusion and cooling will permit the elongated pores as may form during the draw to return to a circular configuration by syneresis, at least on the interior of the wall thickness of the hollow fiber structure. Any elongated pores which are formed will be confined to the outer surface of the hollow fiber.

OBJECTS OF THE INVENTION

It is an object of the present invention to provide hollow fiber membranes having an axially elongated or oblate shape which opens or stretches under backwash pressures by shape distortion, minimizing stretching or breakage of the polymer material and substantially eliminating inelastic stretching.

It is another object of the present invention to provide hollow fiber membranes which are readily cleaned by backwashing and which have an extended service life without substantial permanent fouling when compared to the hollow fiber membranes of the prior art.

It is another object of the present invention to provide a method of making hollow fiber membranes to produce the axially elongated or oblate shape which opens or stretches under backwash pressures by shape distortion, minimizing stretching or breakage of the polymer material and substantially eliminating inelastic stretching.

SUMMARY OF THE INVENTION

The hollow fiber membranes of the present invention are extruded in hollow fiber form from a solution of the membrane polymer in a vehicle which is a solvent for the polymer at temperatures above a miscibility temperature, and which is a non-solvent at temperatures below the miscibility temperature.

The extrudate is quenched by cooling to a temperature below the miscibility temperature to precipitate the polymer from the solution while maintaining the hollow fiber configuration. The cooling causes phase separation of the polymer from the vehicle, and the vehicle serves to form pores within the polymer structure.

The extrudate is drafted during the quenching operation to elongate the pore shapes during their formation in a direction parallel to the axis of the forming hollow fiber. The quenching temperatures and the rate of heat transfer are controlled so that the rate of precipitation of the polymer is higher than the rate of syneresis, resisting the tendency to alter the shape of the pores into a generally circular configuration. A hollow fiber membrane is produced having axially elongated pores with the elongation substantially uniform throughout the thickness of the membrane, from the outer fiber surface to the inner, lumen wall.

The method of making a hollow fiber membrane in accordance with the present invention comprises the following steps:

A. forming a solution of a polymer in a vehicle which is a solvent for the polymer at temperatures above a miscibility temperature and a non-solvent for the polymer at temperatures below the miscibility temperature;

B. extruding the solution in hollow fiber form at a temperature immediately above the miscibility temperature;

C. cooling the solution to a temperature immediately below the miscibility temperature to solidify the polymer into a porous membrane while drafting the hollow fiber form at a rate sufficient to axially elongate the pores in a direction parallel to the axis of the forming hollow fiber, wherein the cooling is conducted at a rate to effect precipitation within an interval shorter than the syneresis relaxation time of the pores.

The resulting hollow fiber membrane has pores which are elongated throughout the thickness of the membrane, with a substantially equal ratio of the elongated dimension to the shorter dimension. The pores are often substantially elliptical in cross section shape, although other, less regular shapes occur as well.

More formally stated, the present invention provides a hollow fiber membrane having an outer surface, and inner surface enclosing a lumen, and a continuous network of interconnecting pores extending from the outer surface to the inner surface, wherein substantially all of the pores have an elongated dimension and a shortened dimension, the elongated dimension being oriented substantially parallel to the axis of the hollow fiber, wherein the ratio of the elongated dimension to the shortened dimension is substantially constant from the outer surface to the inner surface, and wherein the pores change shape to increase the shortened dimension in response to a high pressure differential imposed across the membrane by increasing fluid pressure within the lumen.

When the membrane is used in filtration, the pores will become clogged through use and it will generally be desirable to backwash the membrane at periodic intervals. In back washing, fluid pressure is imposed across the membrane, from the interior lumen. The elongated pore shapes can be distended without requiring the polymer to stretch, resulting in opening of the pores. The opening of the elongated shape is quite effective at permitting the dislodgment of entrained particles of debris, resulting in highly effective and efficient cleaning of the membrane.

DETAILED DESCRIPTION

Figure 1:
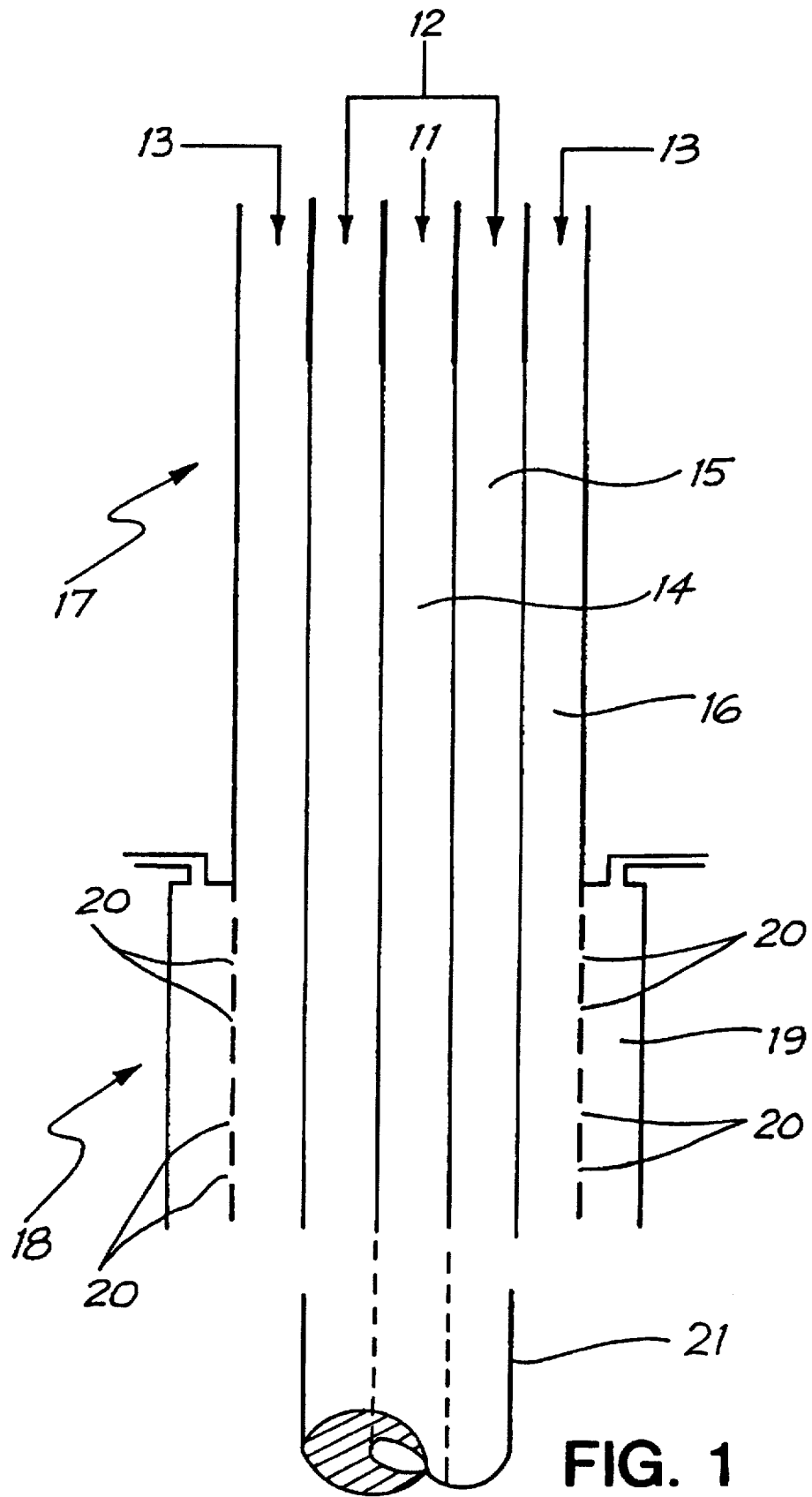
FIG. 1 is a schematic diagram of an extrusion die employed in the invention.
Figure 2:
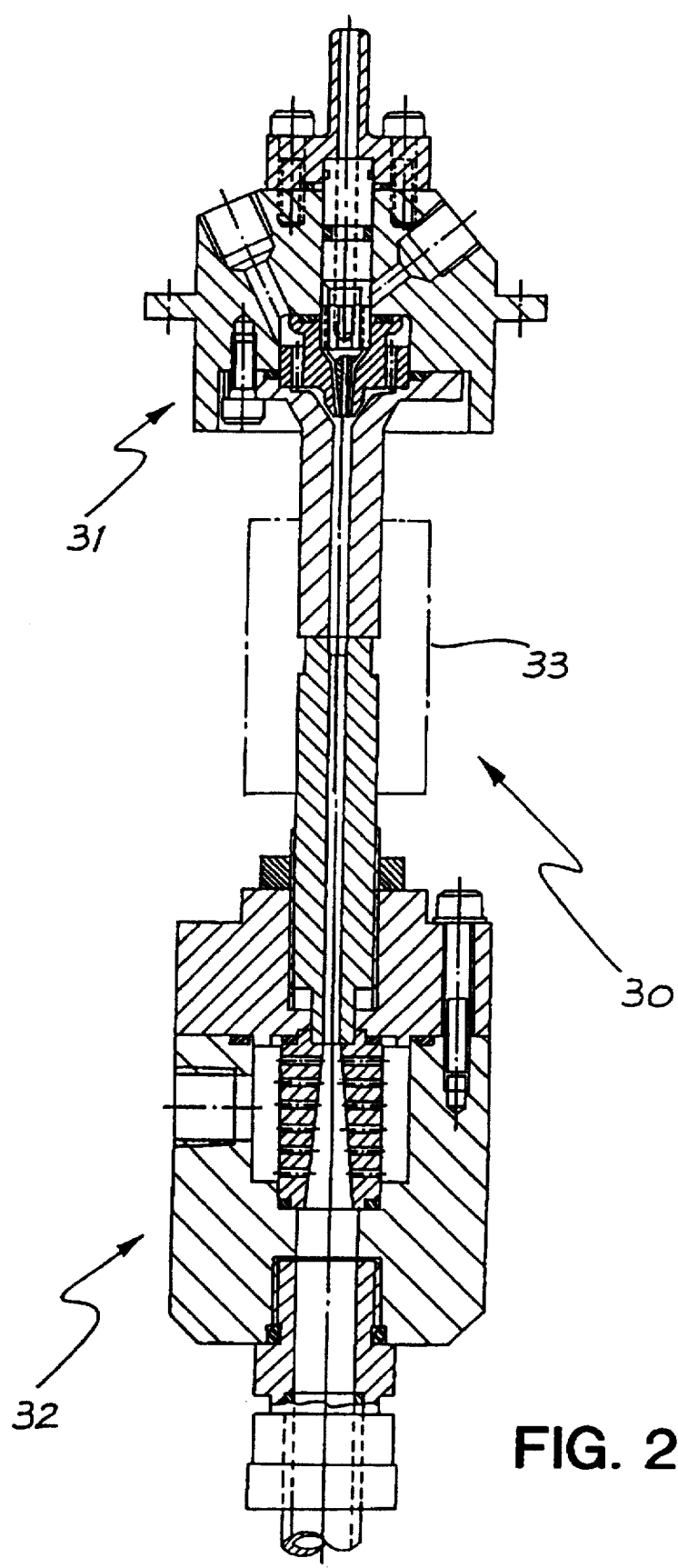
FIG. 2 is a cross-sectional view of an extrusion die assembly preferred in the practice of the invention.

The present invention shares a number of features in common with the techniques taught in the prior art for making hollow fiber membranes. Significant departures from the prior art are also employed, as set out in detail and emphasized in the following description of the invention, to constitute the invention as defined in the appended claims.

In general terms, the present invention is a special case of the hollow fiber membranes and the methods of making them already well known in the art. The methods of making such hollow fiber membranes of which the present invention is a particular case are the thermal casting techniques, based on the extrusion of a solution of the fiber forming polymer in a material which is a solvent for the polymer above a certain temperature and a non-solvent at lower temperatures. The hollow fiber is produced by forming the solution into a hollow fiber shape at elevated temperature, typically by extrusion techniques, and then cooling the solution to precipitate the polymer in solid form in the hollow fiber configuration. Through controlling the rate of cooling, the precipitated polymer solids are porous, i.e., having pores which pass from the outer surface of the fiber through the polymer thickness to communicate with the interior lumen. The dimensions of the pores can be regulated to be quite uniform and reproducible. The mechanism of pore formation is most often ascribed to the phenomenon of spinodal decomposition. The former solvent material is removed from the formed hollow fiber membrane to produce the product.

The present invention may be employed with any of the wide variety of polymers and their respective solvents employed in aft of produce hollow fiber membranes by such techniques. Among those employed to good effect are polyolefins, such as polyethylene, polypropylene and the like, vinyl thermoplastics, such as polyvinylidene fluoride, thermoplastic polyesters, polysulfones, and polyimides and other polymers, as discussed below. Suitable polymer-solvent combinations for use with each of these classes of polymers is known and familiar to the art.

The polymer and solvent are mixed to form a homogeneous solution at a temperature above that at which the polymer precipitates. It should be noted that the solvent appropriate for a particular polymer may be a mixture of two or more miscible materials rather than a single compound, as those of ordinary skill in the art are already aware.

The hollow fiber form is imposed on the solution, still at the elevated temperature above that at which the polymer will precipitate, by extrusion through a hollow fiber forming extrusion die. Such dies ordinarily include provisions to co-extrude a lumen forming fluid into the interior of the formed solution to preserve the hollow fiber form.

The solution temperature is kept above the level at which the polymer will precipitate until extruded. As the formed solution passes through the die, the temperature is reduced to a lower temperature at which the polymer precipitates while maintaining the hollow fiber form. The temperature reducing means employed, typically a fluid quench bath at a temperature less than the temperature at which the polymer precipitates from the solution, is designed to ensure that the rate of heat transfer is sufficient to produce the spinodal decomposition of the solution to produce the porous microstructure within the precipitated polymer. As a general rule, the pore dimensions are variable with the cooling rate in any given system.

In the most common circumstances, the lumen forming fluid is the same material as the polymer solvent. Other techniques known in the art may also be employed, although generally not preferred as they often make the system more difficult to control appropriately.

It is generally preferred that the lumen forming fluid be at substantially the same temperature as the polymer solution or dope at the time of extrusion to avoid any variation in temperature throughout the depth of the extrudate.

In most systems, it is also generally preferred that the temperature reducing means be a quench bath of the same solvent, held at a suitable temperature below the precipitation temperature of the polymer. If a different quench fluid is employed, separation of the materials to permit recycling and re-use are made more difficult.

After the precipitation of the polymer is complete, the solvent is removed by a suitable technique. For some solvents, the fluid viscosity at the reduced temperature is low enough to permit the solvent vehicle to drain from the membrane and from the pores. For other solvent vehicles, it will be necessary to dissolve the vehicle in a suitable solvent to effect removal. After the majority of the solvent is removed, the hollow fiber membrane is typically washed to remove entrained solvent, and thereafter may be handled and treated in any of the fashions employed in the art, such as heat treatments, drying, surfactant washing and surface coating of the polymer, and the like. Such after treatments are generally well known in the art.

Such hollow fiber membranes are typically employed, as noted above, as filters and in other separatory processes, such as dialysis, for example. Such usages and the requirements of filtration systems in which the hollow fiber membranes are to be employed are well know in the art.

Most commonly, hollow fiber membranes are employed in filter cartridges in which a bundle of the porous fibers are bundled within a chamber with the ends gathered and manifolded into a common flow path communicating with the hollow fiber lumen, while the chamber provides a flow path communicating with the outer surfaces of the hollow fiber. Flow through such a filter cartridge is generally into the chamber and into contact with the outer surface, wherein flow through the membrane, into the lumen and out through the lumen manifolding produces the flitrate. Material not passing through the membrane is desirably swept from the membrane surface and out of the chamber by cross flow of the input fluid.

Less commonly, the feed may be passed through the lumen of the hollow fiber membranes, so that the flitrate permeates the walls of the membrane and into the chamber, where it is collected and withdrawn from the filter cartridge.

A wide variety of specific structures and mechanisms are employed in the art to effect filtration and the like with porous hollow fiber membranes.

All such filtration usages will result in the collection of filtered material on the polymer surfaces and within the pores, resulting in a loss of efficiency. While it is common to select polymer membrane materials, or to treat the surfaces of the membrane materials, to minimize fouling and blocking of the filter medium, such techniques are limited in their effectiveness, and it is generally necessary to employ backwashing techniques to periodically clean the membrane. As noted above, backwashing gentle enough to avoid damage to the membrane is limited in ifs effectiveness; backwashing under more severe conditions, more effective to clean the membrane, results in cumulative damage to the membrane which limits its useful life in service, requiring more frequent replacement of the filter medium.

In the present invention, hollow fiber membranes are produced which have pores which are axially elongated of a shape which is oblate or oval in configuration throughout the depth of the membrane structure. Such pores perform their filtration function in a fashion suite like the common round pores produced in the prior art. When subjected to backwashing, however, the pores are able to deform under the backwashing fluid pressure to release entrained debris fouling the pores. The deformation is by bending of the polymer, and not by the more damaging stretching which is required to enlarge the circular pores of prior art.

Unlike the pores having axial elongation only at the outer surface, produced by the Mahoney et al. patent cited above, the uniform elongation throughout the depth is more reliable under severe backwash conditions, affording both a more complete release of accumulated debris from the pores and a longer service life for the membrane.

In the present invention, the elongation of the pores parallel of the axis of the hollow fiber is produced by drafting of the fiber as it is extruded from the die, and precipitating the polymer while the pores are elongated throughout the thickness of the forming membrane wall by the drafting effect on the forming fiber.

While most hollow fiber membrane extrusion processes employ drafting to some degree, the resulting elongation is not fixed in the precipitated polymer because of the powerful effects of syneresis on the solution during the procedure, tending to make the pores circular in cross section once again. In the Mahoney et al. process, cited and discussed above, the effect of syneresis is limited to the interior of the forming fiber, as the pore shape is "frozen" at the surface by a locally high rate of precipitation. In the present invention, the effects of solution syneresis are overcome by assuring that the timing and rate of precipitation are such that the entire hollow fiber membrane is precipitated at a rate more rapid than the effect of syneresis, so that the elongated pores developed by the drafting of the extrudate is not lost, in whole or in part, before precipitation.

Such an effect is dependent on the rate of precipitation. Since syneresis is a very powerful force on the solution and on the incipient pores, the precipitation must be driven by a very rapid heat exchange from the solution temperature to a temperature at which the polymer precipitates. In the present invention, the required high rate of heat exchange is achieved by extruding the solution at a temperature very near the precipitation temperature, by controlling the heat exchange after extrusion via a drafting tube wherein the cooling is controlled by co-extrusion of a coating fluid around the extruded solution, by employing a drafting tube of a length such that both the spinodal decomposition pore formation and drafting to elongate the forming pores are attained within the tube and the beginning of polymer precipitation, the maximum elongation of the pores, and entry of the forming fiber into a quench bath occur substantially simultaneously. The temperature of the quench bath is adapted to provide a heat transfer rate sufficiently rapid that substantially no further change in the pore configuration by syneresis occurs before the precipitation of the polymer is substantially complete.

As an incident of the method of making the hollow fiber membranes of the present invention, we have found that balancing of all the parameters require exceptionally high rates of extrusion of the hollow fiber. Depending on the extent of drafting employed, the extrusion rate should be from about three to about twenty times the rate typically employed in the art. Very high production rates of the hollow fiber membrane result, and are an added benefit of the present invention. In the present invention, the extrusion is typically conducted at a rate of from about 40 meters/minute to about 120 meters/minute, preferably about 50 meters/minute to 80 meters/minute.

The drafting of the extrudate will desirably be sufficient to produce an elongation of the hollow fiber form, and of the forming pores, of from about 2:1 up to about 10:1, relative to no drafting.

In addition to elongating the pores, drafting serves to reduce the diameter of the hollow fiber, and its lumen diameter and wall thickness.

Syneresis of polymer solutions is dependent on viscosity and surface tension of the solution, and varies with the specific polymer-solvent combination, the concentration of the polymer in the solution and the precipitation temperature. Those of ordinary skill in the art will have little difficulty in determining the rate of syneresis for any given solution.

The key to successful practice of the present invention resides in the ability to govern the locus of the point of the beginning of polymer precipitation, the maximum elongation of the pores, and entry of the forming fiber into a quench bath to assure that these parameters coincide and occur substantially simultaneously, and in assuring that the rate of heat transfer at that point is increased to a very high value to effect the most rapid possible precipitation of the polymer, at a rate which is at least more rapid than the effects of syneresis on the shape of the forming pores.

It will generally be preferred to provide that the end of the drafting tube and the passage of the forming fiber info the quench bath occur at the precipitation point. If is the transition from the quench tube into the direct contact with the quench bath fluid which affords the best and most preferred opportunity of attain the very high rate of heat transfer desired. Those of ordinary levels of skill in the art will readily recognize that if is the rate of the temperature drop to a level at which the polymer precipitation proceeds at a very high rate, and not the final temperature attained in the quench bath, which is significant of the present invention.

Given adequately close control over the polymer solution temperature prior to extrusion and the temperature drop of the solution through the extruding die and the drafting tube, the temperature drop required may be only a few degrees, and in some circumstances as little as one degree or even less. Thus, the temperature of the quench bath need not be greatly below that of the casting solution of be highly effective at effecting the slight temperature change required with very great rapidity.

At those of ordinary skill in the art will recognize, the particular temperatures employed in all stages of the processing are determined by the specific polymer and solvent systems employed. For many polymers and solvent systems, these temperatures are well known in the literature and are not themselves a novel part of the present invention.

According of the invention there is provided a method of making a porous polymeric material comprising the steps of A. forming a solution of a polymer in a vehicle which is a solvent for said polymer at a first condition and a non-solvent for said polymer at a second condition;

B. extruding said solution in hollow fiber form at said first condition;

C. changing the conditions of said solution from said first condition to said second condition cooling said solution to solidify said polymer into a porous membrane while drafting said hollow fiber form at a rate sufficient to axially elongate the pores in a direction parallel to the axis of the forming hollow fiber, wherein said change of condition is conducted at a rate to effect precipitation within an interval shorter than the syneresis relaxation time of said elongated pores.

When making a hollow fiber membrane of the present invention, the above first condition is most often a solution temperature above the miscibility temperature of the polymer and vehicle, and the second condition is a temperature below the miscibility temperature of the polymer and solvent, and the change of condition is cooling.

In the alternative, the first condition is a vehicle composition in which the polymer is soluble, while the second condition is a vehicle composition in which the polymer is insoluble, and where the change of condition is the addition of a material which changes said vehicle composition, such as by altering the solubility of the polymer or by diluting the solvent.

The solvent most often employed in the present invention, particularly to form the preferred polypropylene hollow fibers will be a cationic or non-ionic surfactant having a hydrophilic-lipophilic balance range of 4.0 to 6.0.

The hydrophilic-lipophilic balance values are relatively low for surfactants-in other words, the surfactants which are suitable are relatively hydrophobic (i.e., lipophilic). Surfactants with hydrophilic-lipophilic balance values lower than the preferred range have too good a solvency for the membrane to form when the dope is quenched, and surfactants with higher hydrophilic-lipophilic balance values will not dissolve the polymer.

Nonylphenoxypolyethylene glycols (which are also called nonylphenoxy-poly (oxyethylene) ethanols) are represented by the graphical formula

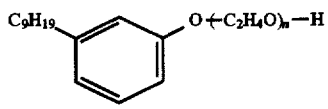

The second member of the series, where n=2, nonyphenoxyethoxyethanol is a preferred surfactant of the present invention and is the most prevalent member of the series in a mixture of nonylphenoxypolyethylene glycols that make up a commercially available solvent TERIC N2 (TERIC is a Registered Trade Mark). Nonylphenoxyethoxyethanol is represented by the graphical formula:

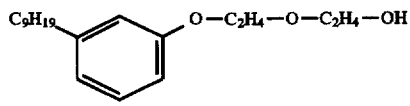

Solvents in this series represent a distribution of non-ylphenoxypolyethylene glycols. The nonylphenoxypolyethylene glycols are initially a mixture represented by a Poissonian distribution, however, the exact distribution of the final product depends on further processing such as distillation of low boiling point components to give the material as provided by the supplier.

The second member of the series can be used in the process of the invention to provide a porous structure but as n increases above 2 the material becomes more and more polar and will not produce porous structures when used in the process of the invention. In the case of TERIC N2, the preferred range of the hydrophilic-lipophilic balance is 5.6 to 5.8.

Another solvent which may be used is SYNPROLAM 35X2 which is an amine ethoxylate of the general formula:

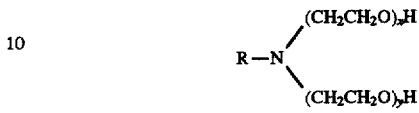

where x+y is 2 to 50 and R is a mixture of $C_{13}$ and $C_{15}$ fatty radicals in the approximate ratio of 70:30 about half of which are linear and the rest mostly branched species. In the case of SYNPROLAM 35X2, x+y=2. Yet another solvent which may be used is BRIJ 92 which is a polyoxyethylene (2) oleyl alcohol. SYNPROLAM and BRIJ are Registered Trade Marks.

Other solvents having a hydrophilic-lipophilic balance in the range of 4.0 to 6.0 which may be used in carrying out the process of the invention include:

(a) ethyloxylated derivatives of cetyl-oleyl alcohol such as TERIC 17A2

(b) condensates of ethylene oxide with tall oil such as TERIC T2

(c) self-emulsifying derivatives from high molecular weight fatty acids such as TERIC 124

(d) sorbitan monooleate (e) sorbitan monastearate (f) sorbitan sesquioleate (g) polyoxyethylene hexitan fatty acid ester (h) polyoxyethylene cetyl oleyl alcohol such as ATLAS G-70140

(i) ATMER 685 nonionic surfactant (j) polyoxyethylene (2) cetyl alcohol (k) polyoxyethylene (2) stearyl alcohol (l) polyoxyethylene fatty alcohols such as CIRRASOL EN-MB and CIRRASOL EN-MP (m) polyoxyethylene (2) synthetic primary $C_{13}/C_{15}$ alcohol such as RENEX 702

ATLAS, ATMER, CIRRASOL and RENEX are Registered Trade Marks.

Although the preferred thermoplastic polymers, because they are the materials in most common use in filtration, are polypropylene and polyvinylidene fluoride, the following polymers may also be used:

(a) polybutylene (b) polyvinylidene dichloride (c) polyamide (d) polyvinyl chloride (e) polystyrene (f) polymethylmethacrylate (g) polyphenylene oxide (h) polyethylene terephthalate (i) polyacrylonitrile (j) polysulfone (k) polyether sulfone (l) cellulose acetate In a preferred form of the invention, the porous polymeric material is formed as a hollow fiber using a quadruple co-extrusion head having four concentric passageways. The axial passageway receives a lumen forming fluid, the next outward passageway contains a homogenous mixture of the polymer and a surfactant solvent to form the membrane, the next outwardly concentric passageway has a coating fluid and the outermost passageway has a cold quench fluid. The lumen, coating and quenching fluids do not contain the surfactant.

Each fluid is transported to the extrusion head by means of individual metering pumps. The four components are individually heated and are transported along thermally insulated and heat traced pipes. The extrusion head has a number of temperature zones. The lumen fluid, membrane dope and coating fluid are brought to the same temperature in a closely monitored temperature zone where the polymer solution making up the dope is shaped. The quench fluid is introduced in a cooling zone where the dope undergoes non-equilibrium liquid—liquid phase separation to form a bi-continuous matrix of large interfacial surface area of two liquids in which the polymer phase is solidified before aggregated separation into distinct phases of small interfacial surface area can take place.

The hollow fiber membrane leaves the extrusion head completely formed and there is no need for any further formation treatment except for removing the surfactant solvent from the membrane in a post-extrusion operation that is common to membrane manufacturing processes. A volatile solvent that does not dissolve the polymer is used to remove the surfactant solvent for the polymer from the finished membrane.

It is preferred that the formed fiber shape is drawn through the quench tube at a rate such that the diameter of the hollow fiber form is reduced in diameter by drafting after it leaves the extrusion head. We prefer that the final diameter of the drawn fiber is in the ratio to the diameter as extruded of from about 0.25:1 to about 0.10:1.

The lumen forming fluid may be selected from a wide variety of substances such as soybean all and an inert gas such as nitrogen. The same substance may be used as the coating and quenching fluids. Water may be used as the quenched fluid. Other substances which may be used as the lumen forming material, the coating fluid and the quenching fluid include:

(a) paraffin oil
(b) peanut oil
(c) teel oil
(d) boleko oil
(e) oil of mustard
(f) olive oil
(g) seneca oil
(h) coconut oil
(i) coffee oil
(j) rapeseed oil
(k) corn oil
(l) cottonseed oil
(m) glycerol
(n) glyceryl trioleate
(o) trimyristin
(p) jojoba oil
(q) macassar oil
(r) neem oil
(s) castor oil
(t) arris root oil (u) safflower oil
(v) oleic, palmitic, stearic, arachidic, arachidanic, behenic, lignoceric, linoleic, linolenic, elaidic, vaccenic acids and their glycerides, and mixed with their sodium, potassium and calcium salts
(w) dioctylphthalate and other phthalate esters of alcohols of six carbon atoms or more, The homogenous mixture of the thermoplastic polymer and surfactant solvent (i.e. dope) may include an antioxidant. In the case of polypropylene, the preferred antioxidant is ETHANOX 330 (ETHANOX is a Registered Trade Mark) which has the chemical name 1,3,5,-trimethyl-2,4,6-tris-3,5-di-tert-butyl-4-hydroxybenzyl)benzene. Any hindered phenol which dissolves in the dope could be used.

It has been found that in the case of the polypropylene/ TERIC N2 system, the concentration of the polymer in the dope may be from 15% to 50% weight by weight although the preferred range is 20% to 40% weight by weight.

Solvent viscosity may be in the range of 10 to 1,000 mPa.s and the quench liquid viscosity may be from 20 to 100 mPa although 50 to 70 mPa is preferred. Using the extrusion apparatus described above, the hollow fiber may be extruded at a rate of 40 to 120 meter/minute although the preferred range is 50 to 85 meter/minute.

Figure 7:
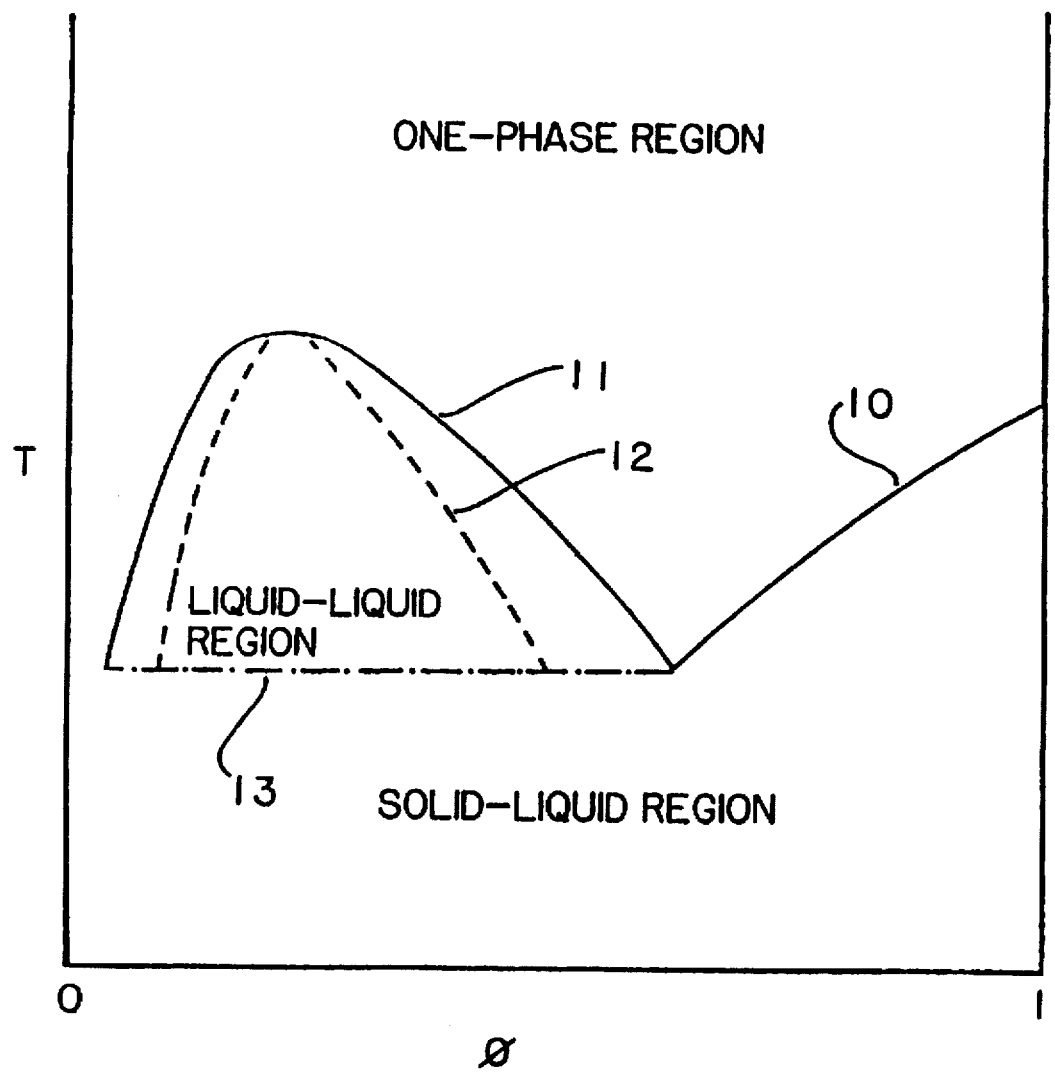
FIG. 7 is a phase diagram for a generalized polymer/solvent system.

FIG. 7 is a temperature-composition phase diagram for a generalized polymer/solvent system showing liquid-liquid and solid-liquid phase separation. The abscissa represents composition of the mixture ranging from no polymer at the left to all polymer at the right. The ordinate represents temperature. To the right of the diagram, line 10 which slopes upwards at a straight oblique angle represents division between complete solution above the line and solid-liquid separation below the line. The region above line 10 extends to the left of the diagram over the top of upwardly convex line or curve 11 so that all of the top of the diagram above lines 10 and 11 represents conditions that result in complete solution of the polymer in the solvent.

Under curve 11 is an upwardly convex dashed line 12 that represents the division between liquid—liquid non-equilibrium phase separation above line 12 and liquid—liquid equilibrium phase separation below line 12. Line 12 is shown dashed because the actual location of the line is indistinct.

The region between the dashed lines 12 and the solid line 11 is a metastable region above which the components must form one phase and below which the components must form distinct liquid phases. The region between the horizontal dash-dot line 13 and solid line 11 is the miscibility gap. The solid line 11 represents phase separation when the temperature is lowered infinitely slowly, and the dashed line 12 represents phase separation when the temperature is lowered infinitely rapidly. Because the manufacturing process of the invention is a non-equilibrium process, it passes from a point above the miscibility gap through the binodal curve (solid line 11) into the metastable region in the vertical direction, and somewhere in that region the liquid—liquid bi-continuous matrix forms, and continuing vertically down through the spinodal curve (dashed line 12) into the liquid—liquid region, and further down past the dash-dot line 13 where the polymer rich phase solidifies, to a point somewhere in the solid-liquid region.

The position along the horizontal axis where the quench is performed determines what structure is obtained. A granular structure generally occurs from positions to the left of the apex of the bimodal and spinodal curves. A granular structure is in our view of little commercial value for microporous membranes using gaseous backwash. Our process uses conditions to the right of the apex of the binodal and spinodal curves which result in a spinodal decomposition structure. In our view any membrane produced by thermal precipitation that has a spinodal decomposition structure must have been made by spinodal decomposition.

Figure 8:
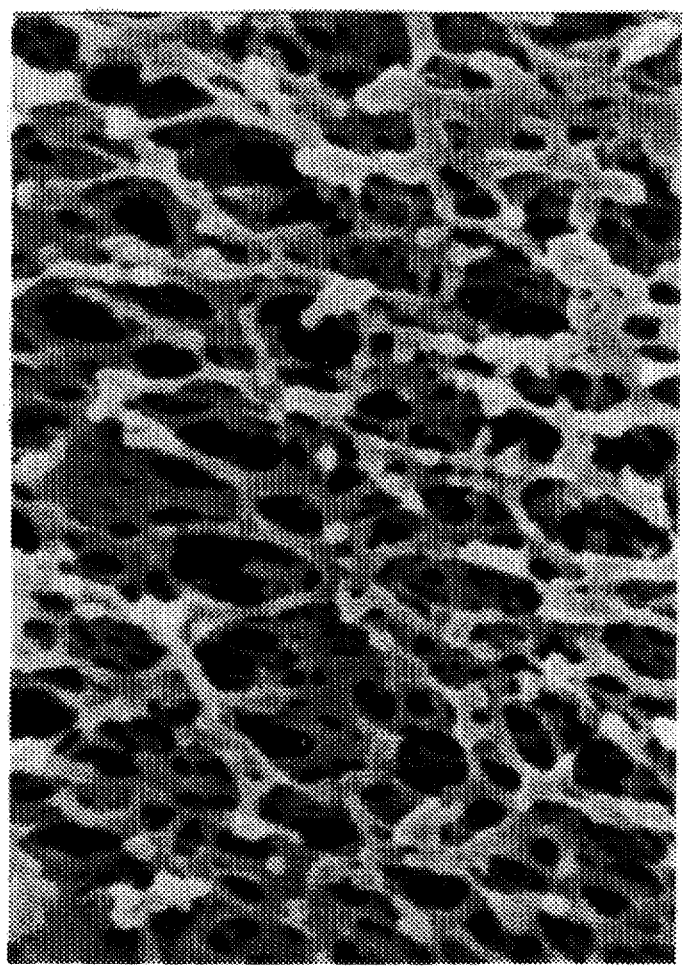
FIGS. 8, 9, and 10 are photomicrographs of membranes of the present invention, showing pore elongations of, respectively, 2, 3 and 5.
Figure 9:
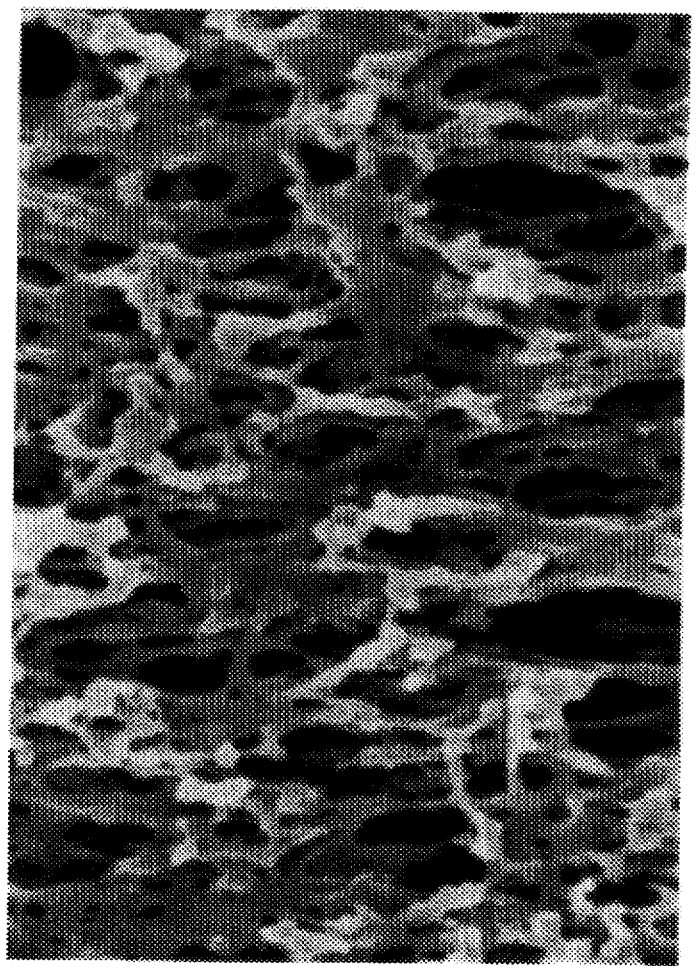
Figure 10:
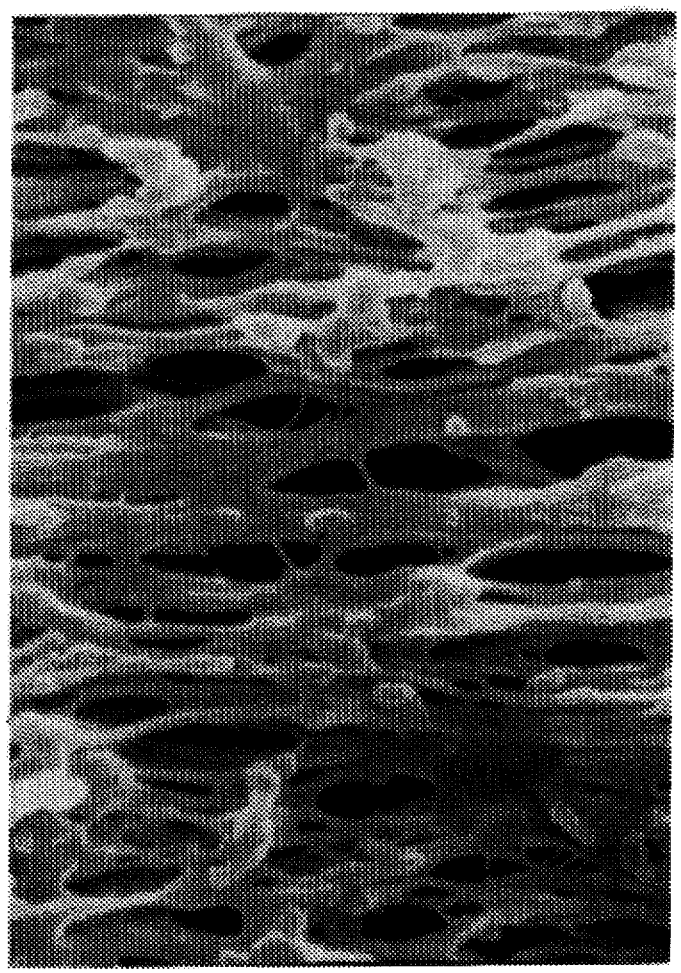

FIGS. 8, 9, and 10 are a photomicrographs taken of three preferred porous polypropylene hollow fiber membranes prepared according to the method of the present invention. In FIG. 8, the pore ratio is 2:1, while that in FIG. 9 is 3:1 and that of FIG. 10 is 5:1.

According to the invention there is also provided an extrusion die assembly for producing a hollow fiber membrane which has a quadruple co-extrusion head having four concentric passageways. The axial passageway receives a lumen forming fluid, the next outward passageway receives a homogenous mixture of the polymer and a surfactant solvent to form the membrane, the next outwardly concentric passageway receives a coating fluid and the outermost passageway receives a cold quench fluid.

Each fluid is transported to the extrusion head by means of individual metering pumps. The four fluids are individually heated and are transported along thermally insulated and heat traced pipes. The extrusion head has a number of temperature zones. The lumen fluid, membrane dope and coating fluid are brought of the same temperature in a closely monitored temperature zone where the polymer solution making up the dope is shaped. The quench fluid is introduced in a cooling zone where the dope undergoes non-equilibrium liquid—liquid phase separation to form a hi-continuous matrix of large interfacial surface area of two liquids in which the polymer phase is solidified before aggregated separation info distinct phases of small interfacial surface area can take place.

The hollow fiber membrane leaves the extrusion head completely formed and there is no need for any further formation treatment except for removing the surfactant solvent from the membrane in a post-extrusion operation that is common to membrane manufacturing processes. A volatile solvent that does not dissolve the polymer is used to remove the surfactant solvent for the polymer from the finished membrane.

The extrusion die shown in schematic form in FIG. 1 has, at its upper end, three concentric passageways 11, 12 and 13. The axial passageway 11 carries a lumen fluid 14 such as nitrogen gas, the inner annular passageway 12 carries a homogeneous solution (or dope) 15 of polymer material and surfactant and the outer annular passageway 13 carries a hot coating fluid 16 such as soybean oil. Neither the lumen fluid nor the coating fluid contain the surfactant present in the dope passing through passageway 12. The thick lines in FIG. 1 represent walls and the thin lines represent interfaces between the various fluids.

The upper portion 17 of the extrusion head 10 is a closely monitored temperature zone. Within the hot zone 17, the coating material remains as a coating on the membrane 21 being formed and dissolves part of the surface of the membrane 21 to provide a porous surface on the membrane.

Below the hot zone 14 there is a cooling zone 18 which includes an annular quench fluid passageway 19. The quench fluid, which may be cold soybean oil, is pumped through the quench passageway 19 at a fixed rate and the coolant or quench fluid is not open to atmosphere. The inner wall of quench passageway 19 has a series of openings 20 through which the quench fluid passes. Beneath the extrusion head 10 there is a collection point for receiving the extruded membrane 21.

An extrusion die assembly 30 according to one embodiment of the invention is shown in FIGS. 2 to 5 and consists of an upper or melt die portion 31 and a lower or quench tube die portion 32 coupled together by a union 33.

Figure 3:
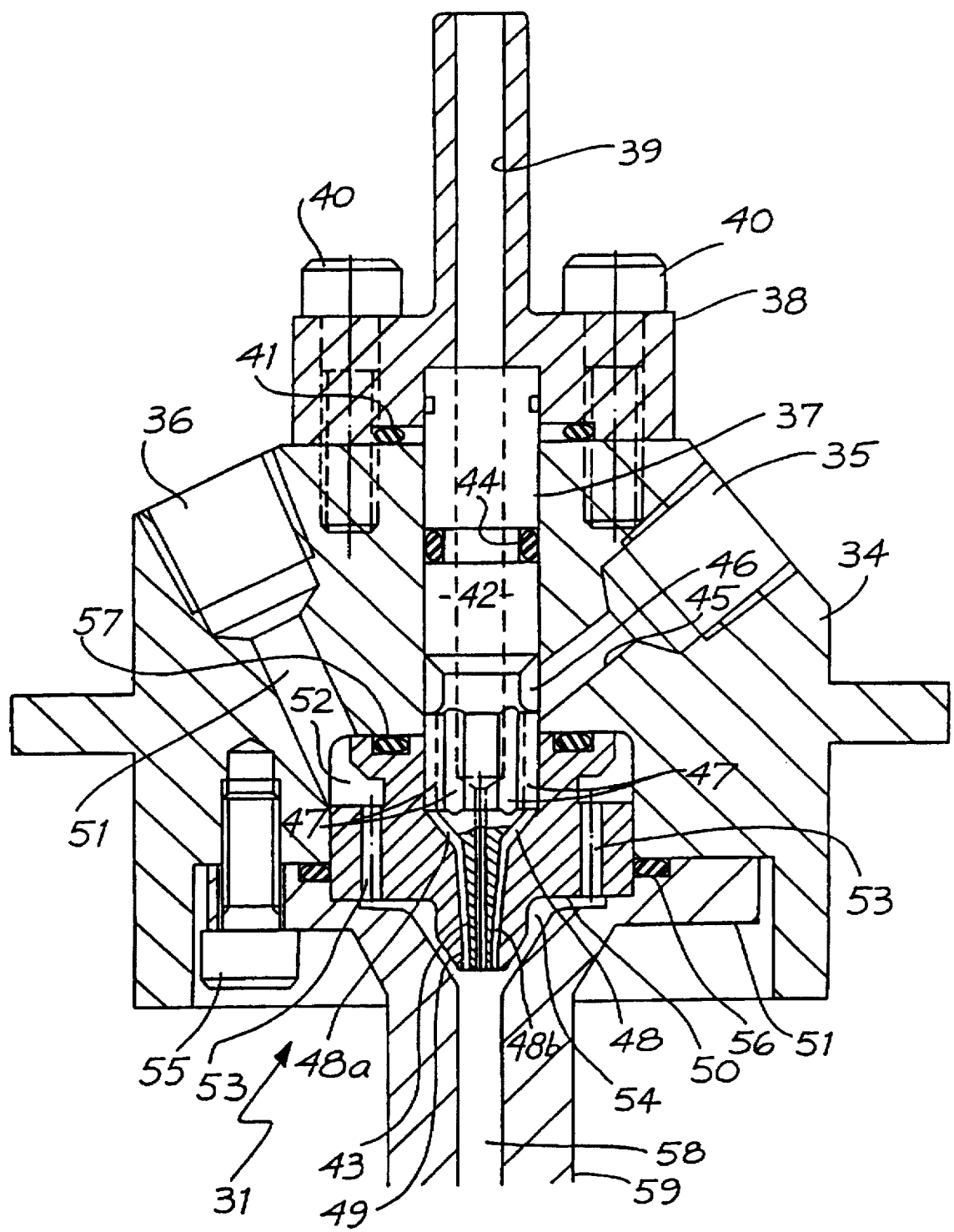
FIG. 3 is an enlarged cross-sectional view of the upper or melt die portion of the extrusion die assembly of FIG. 2.

The melt die portion 31 which is shown on an enlarged scale in FIG. 3, has a body 34 having an inlet 35 for receiving membrane forming dope and an inlet 36 for receiving coating fluid. The body has a central bore 37 and at its upper end there is a closure plate 38 having an axial passageway 39 for receiving a lumen forming fluid. The plate 38 is secured of the body 34 by bolts 40 and a seal is provided by "O" ring 41.

Within the central bore 37 of the body 34 there is a nozzle member 42 which depends from the plate 38. The axial passageway 39 is reduced in diameter at its lower end where if passes through the tapered end 43 of nozzle member 42. The nozzle member 42 is sealed in the body 34 by "O" ring 44. The passageway 39 corresponds of passageway 11 of FIG. 1.

The dope inlet 35 leads of a dope delivery passageway 45 in communication with an annular chamber 46 formed in the outer surface of nozzle 42. Dope is discharged from the chamber 46 into passageway 47 which exits into a tapered annular fiber forming tube 48 defined between the outer face of the nozzle 42 and a recess 49 formed in die plate 50.

Figure 5:
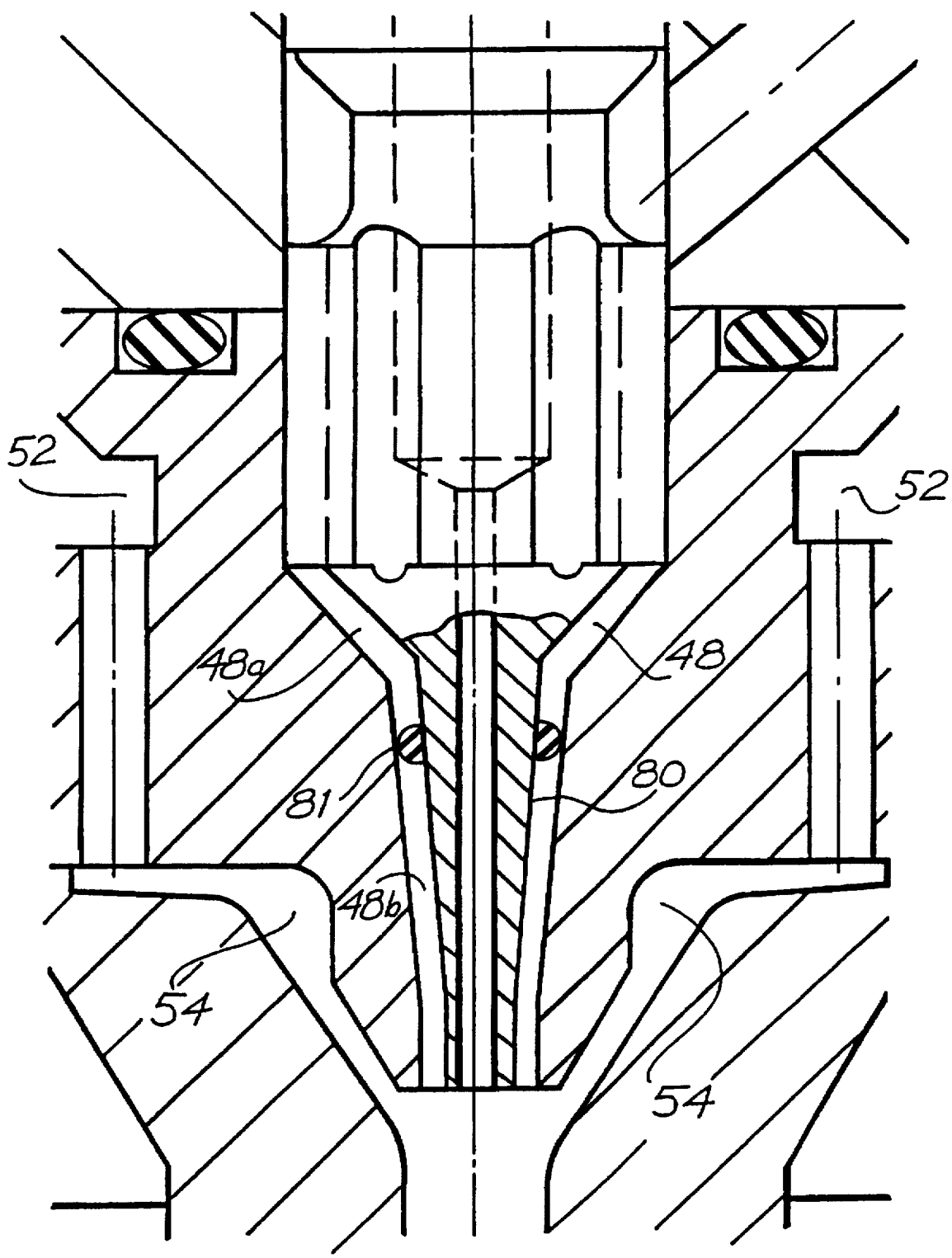
FIG. 5 is an enlarged cross-sectional view of the discharge nozzle of the melt die portion of the extrusion die assembly shown in FIG. 2.

As can be seen in FIGS. 3 and 5 the fiber forming tube 48 has an upper conical portion 48a and a lower conical portion 48b. The upper portion 48a is inclined at a larger angle to the vertical than the lower portion 48b. In this instance, the angle of inclination of the upper portion is from 30° to 60° from the axis and that of the lower portion is from 1° to 10° from the axis. In the preferred embodiment, the angle from the axis on the upper portion of nozzle 42 is 44° and on the upper portion of the die plate 50 is 50° and on the lower portion of nozzle 42 is 3° and on the lower portion of ringplate 50 is 5°. The tapered tube 48 provides a neck-down ratio (that is the ratio of the molten dope at the bottom of the tube 48 of diameter of the finished fiber) of 2.1 to 1. The neck down ratio may be in the range of 1:4 to 10:1.

The coating fluid inlet 36 leads to a coating fluid delivery passageway 51 in communication with an annular chamber 52 formed by a recess in the bottom of the body 34 and the die plate 50. Coating fluid is discharged from chamber 52 into passageways 53 formed in the die plate 50 which exit into an annular chamber 54 formed between the bottom of the die plate 50 and ring plate 51.

The ring plate 51 is secured to the body 34 by bolt 55. "O" ring 56 provides a seal between the ring plate 51, die plate 50 and body 34 and "O" ring 57 provides a seal between die plate 50 and body 34. A central bore 58 of the stem portion 59 of the ring plate 51 receives the fiber which is retained in hollow form by the lumen fluid and which is coated with the coating fluid.

Figure 4:
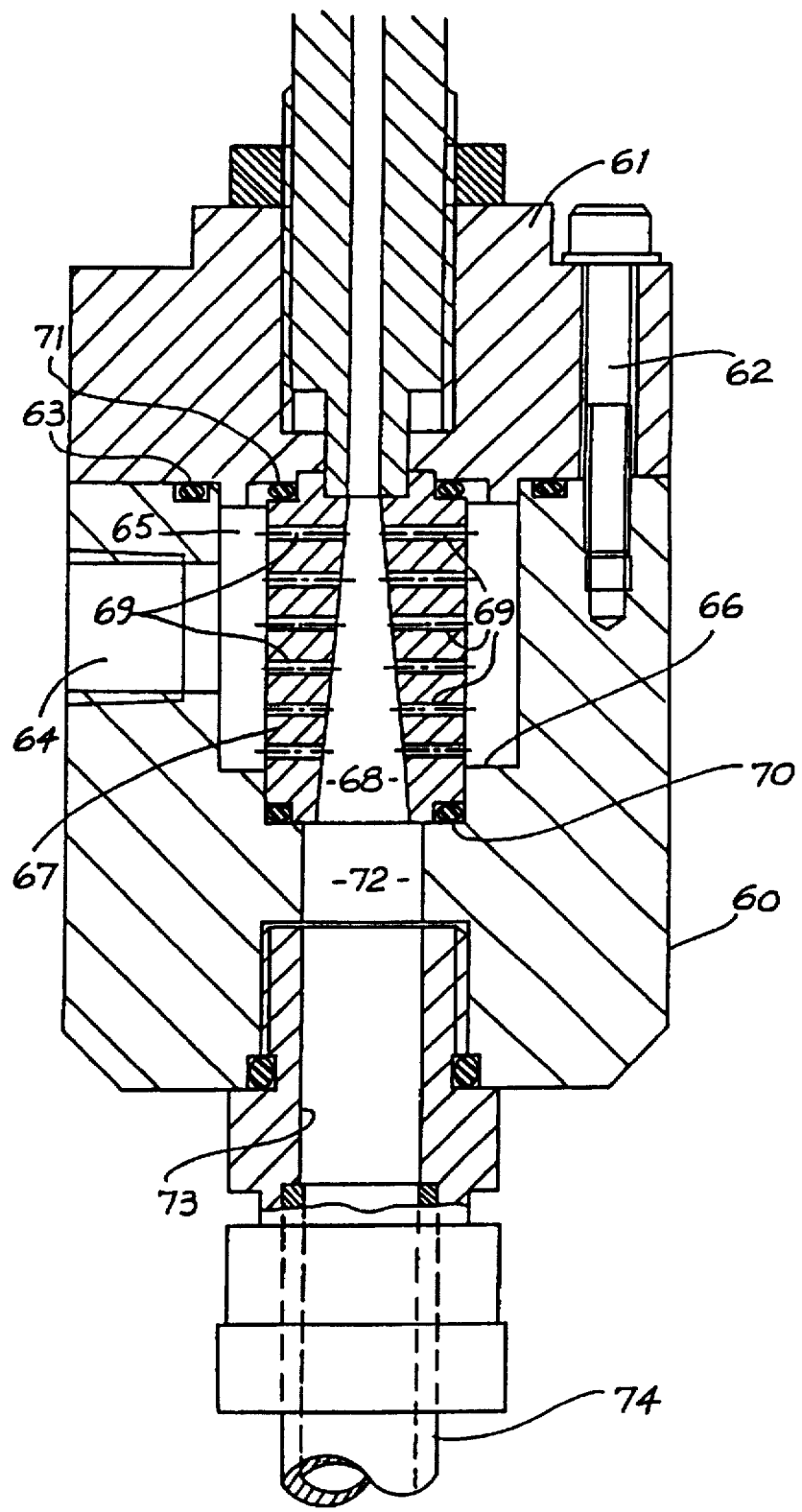
FIG. 4 is an enlarged cross-sectional view of the lower or quench tube portion of the extrusion die shown in FIG. 2.

The quench tube portion 32 which is shown on an enlarged scale in FIG. 4 has a body portion 60 and a connector plate 61 secured thereto by bolt 62. "O" ring 63 provides a seal between the body 60 and plate 61. The body 60 as a quench fluid inlet 64 which leads to a quench fluid chamber 65 formed by a recess 66 formed in the body 60.

Within the recess 66 there is a quench oil diffuser 67 having an axial bore 68. Passageways 69 connect the chamber 65 to the bore 68.

"O" ring 70 seals the diffuser 67 with respect to the body 60 and "O" ring 71 seals the diffusion 67 with respect to the connector plate 61. The bore 68 of the diffuser 67 is in communication with the bore 72 of body 60 which in turn is in communication with the bore 73 of discharge tube 74.

FIG. 5 is an enlarged view of the discharge nozzle 42 which, in this instance, is modified to be in the nature of a needle 80 having a plurality of protrusions 81 which act to self center the needle 80 within the chamber 48.

Figure 6:
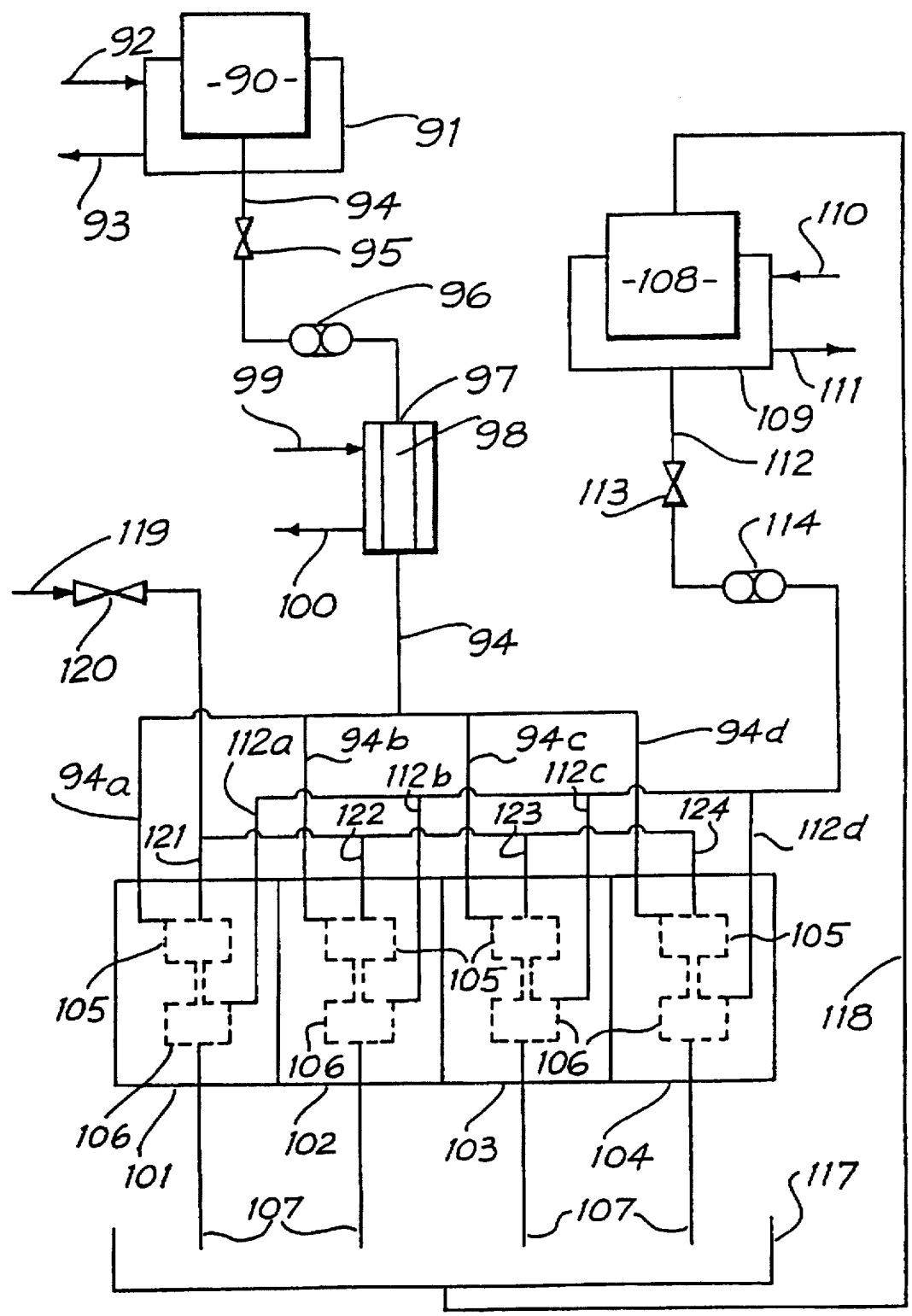
FIG. 6 is a schematic diagram of an extrusion installation for practice of the invention.

The extrusion line shown in FIG. 6 includes a vessel 90 containing a membrane forming solution or dope. Around the vessel 90 there is a heating jacket 91 coupled to a heating oil system (not shown) by lines 92 and 93. Dope from the vessel 90 is drawn through line 94 and valve 95 by gear pump 96. From the gear pump 96, the dope passes through filter 97 having a heating jacket 98 coupled to the heating oil system by lines 99 and 100.

Downstream of the filter 97, dope line 94 branches into four lines 94a, 94b, 94c and 94d which lead to extrusion die heads 101, 102, 103 and 104 respectively. Each die head has a melt portion 105 of the kind described in relation to FIG. 3 and a quench tube portion 106 of the kind described in relation to FIG. 4. Lines 107 represent the formed hollow fibers which are extruded from the die heads 101, 102, 103 and 104. The hollow fibers are wound onto reels (not shown).

A vessel 108 containing a quench fluid has a heating jacket 109 coupled to the oil heating system by lines 110 and 111. Quench fluid is drawn through line 112 and valve 113 by gear pump 114. Downstream of the pump 114, the line 112 branches into four lines 112a, 112b, 112c and 112d which lead to the respective quench tube portions 106 of the die heads 101, 102, 103 and 104. After passing through the tube portions 106 the quench fluid is collected in reservoir 117 and returned to vessel 108 through line 118.

A lumen forming fluid is introduced through line 119 and valve 120. Downstream of the valve 120, line 119 branches into line 121, 122, 123 and 124 which lead to the respective melt portions 105 of the die heads 101, 102, 103 and 104.

The various pipes of the installation are insulated and all parameters are controlled by a microprocessor.

The hollow fiber membrane has a spinodal decomposition structure in which there is some slight orientation of the strands in the axial direction of the fiber so that when a lumenal gaseous blowback procedure is implemented to clean the fibers, certain dimensions of the interstices increase on average allowing any material lodged in the interstices to be easily dislodged. The interstices are of a generally axially elongated shape and when the gaseous blowback is applied, the interstices distort from the axially elongated shape into a generally square shape to enlarge the minimum dimension of the interstices. The gaseous blowback will also stretch the fiber of increase the minimum dimension of the interstices.

The spinodal decomposition structure does not lend itself to a facile qualitative description in terms used of describe prior art membranes such as cells and pores. In the prior art such as U.S. Pat. No. 4,519,909, cells relate to spheres end pores relate to cylinders. The structure of the membranes of the present invention are best understood with reference to the photomicrographs of FIGS. 9, 10 and 11. A typical spinodal decomposition structure of the prior art may have substantially spherical "cells" of between 0.1 to 5 micron which have substantially circular "pores" of 0.1 to 0.5 micron interconnecting the cells to each other. The "pores" also connect the cells to alveoli of about 8 to 20 micron. In the present invention, the pores have a comparable structure, but are elongated in the direction of the axis of the fiber structure, as shown in the photomicrographs of FIGS. 9, 10 and 11.

During extrusion, the coating fluid mixes significantly with the molten polymer solution to a greater extent than the quench fluid mixes when the coating fluid is omitted. The coating fluid controls the surface porosity of the membrane. The hot coating fluid ameliorates the sudden cooling effect of the quench fluid on the dope. The coating fluid is a separate, co-extrusion, and is neither part of the membrane extrusion nor the quench co-extrusion.

It is of be noted that the fiber travels down the quench tube at a significantly different linear speed from the quench fluid. The extruded fiber travels at a speed three to four times faster than the average speed of the quench fluid. Such a speed difference calculated on the average speed also means that the fiber travels at a speed about double the maximum speed of the quench fluid. The average and maximum speed of the quench fluid above are taken as the speed with no fiber present.

Although the above example refers to the use of nitrogen as the lumen forming fluid, any saturated vapor may be used as may a wide variety of liquids. When nitrogen (or a saturated vapor) is used, it has the effect of reducing the lumenal surface pore size, giving greater asymmetry. Use of a saturated vapor has the property that it will condense in the lumen under cooling, allowing the quench fluid to pass through the porous walls, and give some measure of mechanical compression to the solidifying membrane.

It is also possible to practice the present invention employing a non-solvent quench bath rather than a thermal quenching mechanism. In such a technique, the dope is extruded and drawn while exposing the forming fiber to a bath or coextruded quench fluid which is a non-solvent for the polymer and a solvent for the dope solvent. The quench operates to withdraw solvent from the dope, resulting in precipitation of the polymer in the porous hollow fiber form.

EXAMPLES

All processing in the following examples was conducted on the apparatus shown in FIGS. 1 to 6, as discussed above.

Example 1

A dope was formed by mixing and then heating 2,600 gram of polypropylene pellets, 7,300 gram of TERIC N2 and 100 gram of anti-oxidant ETHANOX 330. The temperature of the dope was raised to above 220° C. with agitation under vacuum to ensure that the mixture became homogeneous. The dope was then extruded through the quadruple passage die at a temperature of 230° C.

Nitrogen was used as the lumen forming fluid and soybean oil as the coating fluid and quenching fluid. The dope flow rate was 68 cc/min, the lumen pump flow rate 4.5 cc/min at 220° C., the coating pump flow rate 8 cc/min at 220° C., and the quench flow rate was 2000 cc/min at 37.5° C. The fiber was drawn to a ration of 4:1, providing a take-up speed of 60 meters/minute. The pores were elongated in the direction parallel to the axis of the hollow fiber to a ratio of 4:1

Example 2

A dope was formed by mixing and then heating 2,600 gram of polypropylene pellets, 7,300 gram of TERIC N2 and 100 gram of anti-oxidant ETHANOX 330. The temperature of the dope was raised to above 220° C. with agitation under vacuum to ensure that the mixture became homogeneous. The dope was then extruded through the quadruple passage die at a temperature of 210° C.

Nitrogen was used as the lumen forming fluid and soybean oil as the coating fluid and quenching fluid. The dope flow rate was 68 cc/min, the lumen pump flow rate 4.5 cc/min at 220° C., the coating pump flow rate 8 cc/min at 220° C., and the quench flow rate was 2000 cc/min at 37.5° C. The fiber was drawn to a ratio of 4:1, providing a fake-up speed of 60 meters/minute. The pores were elongated in the direction parallel to the axis of the hollow fiber to a ration of 3:1

Example 3

A dope was formed by mixing and then heating 2,600 gram of polypropylene pellets, 7,300 gram of TERIC N2 and 100 gram of anti-oxidant ETHANOX 330. The temperature of the dope was raised to above 220° C. with agitation under vacuum to ensure that the mixture became homogeneous. The dope was then extruded through the quadruple passage die at a temperature of 190° C.

Nitrogen was used as the lumen forming fluid and soybean oil as the coating fluid and quenching fluid. The dope flow rate was 68 cc/min, the lumen pump flow rate 4.5 cc/min at 220° C., the coating pump flow rate 8 cc/min at 220° C., and the quench flow rate was 2000 cc/min at 37.5° C. The fiber was drawn to a ratio of 4:1, providing a take-up speed of 60 meters/minute. The pores were elongated in the direction parallel to the axis of the hollow fiber to a ration of 5:1

Example 4

A dope was formed by mixing and then heating 2,600 gram of polypropylene pellets, 73,00 gram of TERIC N2 and 100 gram of anti-oxidant ETHANOX 330. The temperature of the dope was raised to above 220° C. with agitation under vacuum to ensure that the mixture became homogeneous. The dope was then extruded through the quadruple passage die at a temperature of 180° C.

Nitrogen was used as the lumen forming fluid and soybean oil as the coating fluid and quenching fluid. The dope flow rate was 68 cc/min, the lumen pump flow rate 4.5 cc/min at 220° C., the coating pump flow rate 8 cc/min at 220° C., and the quench flow rate was 2000 cc/min at 37.5° C. The fiber was drawn to a ratio of 4:1, providing a take-up speed of 60 meters/minute. The pores were elongated in the direction parallel to the axis of the hollow fiber to a ration of 3:1

Example 5

A dope was formed by mixing and then heating 2,600 gram of polypropylene pellets, 7,300 gram of TERIC N2 and 100 gram of anti-oxidant EHANOX 330. The temperature of the dope was raised to above 220° C. with agitation under vacuum to ensure that the mixture became homogeneous. The dope was then extruded through the quadruple passage die at a temperature of 230° C.

Nitrogen was used as the lumen forming fluid and soybean oil as the coating fluid and quenching fluid. The dope flow rate was 79.3 cc/min, the lumen pump flow rate 5.3 cc/min at 220° C., the coating pump flow rate 9.3 cc/min at 220° C., and the quench flow rate was 2000 cc/min at 37.5° C. The fiber was drawn to a ration of 4:1, providing a take-up speed of 60 meters/minute. The pores were elongated in the direction parallel to the axis of the hollow fiber to a ratio of 3:1

Example 6

A dope was formed by mixing and then heating 2,600 gram of polypropylene pellets, 7,300 gram of TERIC N2 and 100 gram of anti-oxidant ETHANOX 330. The temperature of the dope was raised to above 220° C. with agitation under vacuum to ensure that the mixture became homogeneous. The dope was extruded through the quadruple passage die at a temperature of 230° C.

Nitrogen was used as the lumen forming fluid and soybean oil as the coating fluid and quenching fluid. The dope flow rate was 68 cc/min, the lumen pump flow quench flow rate was 2000 cc/min at 37.5° C. The fiber was drawn to a ratio of 4:1, providing a fake-up speed of 60 meters/minute. The pores were elongated in the direction parallel to the axis of the hollow fiber to a ratio of 4:1

Example 7

A dope was formed by mixing and then heating 2,600 gram of polypropylene pellets, 7,300 gram of TERIC N2 and 100 gram of anti-oxidant ETHANOX 330. The temperature of the dope was raised to above 220° C. with agitation under vacuum to ensure that the mixture became homogeneous. The dope was then extruded through the quadruple passage die at a temperature of 230° C.

Nitrogen was used as the lumen forming fluid and soybean oil as the coating fluid and quenching fluid. The dope flow rate was 90.7 cc/min, the lumen pump flow rate 6 cc/min at 220° C., the coating pump flow rate 10.3 cc/min at 220° C., and the quench flow rate was 2000 cc/min at 37.5° C. The fiber was drawn to a ratio of 4:1, providing a take-up speed of 60 meters/minute. The pores were elongated in the direction parallel to the axis of the hollow fiber to a ratio of 3:1

Example 8

A dope was formed by mixing and then heating 2,600 gram of polypropylene pellets, 7,300 gram of TERIC N2 and 100 gram of anti-oxidant ETHANOX 330. The temperature of the dope was raised to above 220° C. with agitation under vacuum to ensure that the mixture homogeneous. The dope was then extruded through the quadruple passage die at a temperature of 230° C.

Nitrogen was used as the lumen forming fluid and soybean oil as the coating fluid and quenching fluid. The dope flow rate was 61 cc/min, the lumen pump flow rate 3.4 cc/min at 220° C., the coating pump flow rate 11 cc/min at 220° C., and the quench flow rate was 3000 cc/min at 37.5° C. The fiber was drawn to a ratio of 4:1, providing a take-up speed of 60 meters/minute. The pores were elongated in the direction parallel to the axis of the hollow fiber to a ratio of 3:1

Example 9

A dope was formed by mixing and then heating 2,600 gram of polypropylene pellets, 7,300 gram of TERIC N2 and 100 gram of anti-oxidant ETHANOX 330. The temperature of the dope was raised to above 220° C. with agitation under vacuum to ensure that the mixture became homogeneous. The dope was then extruded through the quadruple passage die at a temperature of 230° C.

Nitrogen was used as the lumen forming fluid and soybean oil as the coating fluid and quenching fluid. The dope flow rate was 62 cc/min, the lumen pump flow rate 3.5 cc/min at 220° C., the coating pump flow rate 8 cc/min at 220° C., and the quench flow rate was 3000 cc/min 37.5° C. The fiber was drawn to a ratio of 4:1, providing a take-up speed of 60 meters/minute. The pores were elongated in the direction parallel to the axis of the hollow fiber to a ratio of 2:1

Example 10

A dope was formed by mixing and then heating 2,600 gram of polypropylene pellets, 7,300 gram of TERIC N2 and 100 gram of anti-oxidant ETHANOX 330. The temperature of the dope was raised to above 220° C. with agitation under vacuum to ensure that that the mixture became homogeneous. The dope was then extruded through the quadruple passage die at a temperature of 220° C.

Nitrogen was used as the lumen forming fluid and soybean oil as the coating fluid and quenching fluid. The dope flow rate was 22 cc/min, the lumen pump flow rate 7.6 cc/min at 220° C., the coating pump flow rate 5.0 cc/min at 220° C., and the quench pump flow rate was 1,750 cc/min at 37.5° C. The fiber was drawn at a take-up speed of 60 meters/minute. The pores were elongated in the direction parallel to the axis of the hollow fiber.

The circularly of the hollow fiber prior to extraction of the solvent was 95% and the break extension was 175%. After extracting the solvent, the physical characteristics of the fiber were:

| | |
|---|---|
| Lumen diameter | 340 micron |
| Outer diameter | 640 micron |
| Circularity | |
| Concentricity | |
| Bubble Point | >170 kPa |
| % pores above 0.16 micron | >50% |
| Mean pore size | 0.20 micron |
| Water Permeability at 50 kPa | >40 cc/min/m |
| Yield force | 0.8 N |
| Break force | 1.0 N |
| Break extension | >150% |

Water Permeability tests showed that the permeability of a typical fiber from outside to lumen was one third of the permeability from lumen to outside.

Although the invention has been described in relation to a polypropylene/TERIC N2 solution, it is to be understood that the invention is not limited thereto. Soybean oil with or without castor oil may be added to the solution as co-solvent and SYNPROLAM 35X2 or BRIJ 92 may be used instead of TERIC N2. A solvent may be added to the coating fluid.

Example 11

The procedure of Example 10 was repeated, with the following differences:

5.2 kg Hoechst polypropylene PPN1060F was dissolved in 14.6 kg TERIC N2 with 0.2 kg antioxidant Ethanox 330 and extruded at a temperature of 230° C. with soybean oil as the lumen, coating and quench fluids. The quench fluid temperature was 31.3° C.

The dimensions of the fiber were 322 micron lumen diameter and 671 micron outside diameter.

The resulting fiber had a water permeability of 106 ml/min/m at 96 kPa, 367 ml/min/m at 398 kPa, and 478 ml/min/m at 599 kPa, a mean pore size of 0.301 micron and 90.7% pores above 0.16 micron. The fiber was drawn at a take-up speed of 60 meters/minute. The pores were elongated in the direction parallel to the axis of the hollow fiber.

Other properties were substantially the same as those of Example 10.

Example 12

The procedure of Example 10 was repeated, with the following differences:

5.2 kg Hoechst: polypropylene PPN1060F was dissolved in 14.6 kg TERIC N2 with 0.2 kg antioxidant Ethanox 330 and extruded at a temperature of 230° C. with soybean oil as the lumen, coating and quench fluids. The quench fluid temperature was 29.9° C.

The dimensions of the fiber were 324 micron lumen diameter and 652 micron outside diameter.

The resulting fiber had a water permeability of 126 ml/min/m at 96 kPa, 430 ml/min/m at 398 kPa, and 543 ml/min/m at 599 kPa, a mean pore size of 0.380 micron and 95.2% pores above 0.16 micron. The fiber was drawn af a take-up speed of 60 meters/minute. The pores were elongated in the direction parallel to the axis of the hollow fiber.

Other properties were substantially the same as those of Example 10.

Example 13

The procedure of Example 10 was repeated, with the following differences:

5.2 kg Hoechst polypropylene PPN1060F was dissolved in 14.6 kg TERIC N2 with 0.2 kg antioxidant Ethanox 330 and extruded at a temperature of 230° C. with soybean oil as the lumen, coating and quench fluids. The quench fluid temperature was 31.7° C.

The dimensions of the fiber were 323 micron lumen diameter and 640 micron outside diameter.

The resulting fiber had a water permeability of 94 ml/min/m at 95 kPa, 330 ml/min/m at 396 kPa, and 448 ml/min/m at 598 kPa, a mean pore size of 0.310 micron and 87.9% pores above 0.16 micron. The fiber was drawn at a take-up speed of 60 meters/minute. The pores were elongated in the direction parallel to the axis of the hollow fiber.

Other properties were substantially the same as those of Example 10.

Example 14

The procedure of Example 10 was repeated, with the following differences:

5.2 kg Hoechst polypropylene PPN1060F was dissolved in 14.6 kg TERIC N2 with 0.2 kg antioxidant Ethanox 330 and Extruded af a temperature of 230° C. with soybean oil as the lumen, coating and quench fluids. The-quench fluid temperature was 31.8° C.

The dimensions of the fiber were 320 micron lumen diameter and 627 micron outside diameter.

The resulting fiber has a wafer permeability of 80 ml/min/m at 98 kPa, 288 ml/min/m at 399 kPa, and 393 ml/min/m at 600 kPa, a mean pore size of 0.260 micron and 80.9% pores above 0.16 micron. The fiber was drawn at a take-up speed of 60 meters/minute. The pores were elongated in the direction parallel to the axis of the hollow fiber.

Other properties were substantially the same as those of Example 10.

Example 15

The procedure of Example 10 was repeated, with the following differences:

5.2 kg Hoechst polypropylene PPN1060F was dissolved in 14.6 kg TERIC N2 with 0.2 kg antioxidant Ethanox 330 and extruded at a temperature of 230° C. with soybean oil as the lumen, coating and quench fluids. The quench fluid temperature was 30.5° C.

The dimensions of the fiber were 325 micron lumen diameter and 642 micron outside diameter.

The resulting fiber had a water permeability of 73 ml/min/m at 98 kPa, 288 ml/min/m at 399 kPa, and 393 ml/min/m at 600 kPa, a mean pore size of 0.260 micron and 80.9% pores above 0.16 micron. The fiber was drawn at a take-up speed of 60 meters/minute. The pores were elongated in the direction parallel of the axis of the hollow fiber.

Other properties were substantially the same as those of Example 10.

Example 16

The procedure of Example 10 was repeated, with the following differences: 6.75 kg Hoechst polypropylene PPN1060F was dissolved in 18.25 kg TERIC N2 with 0.25 kg antioxidant Ethanox 330 and extruded at a temperature of 230° C. with soybean oil as the lumen, coating and quench fluids. The quench fluid temperature was 30.1° C.

The nominal dimensions of the fiber were 320 micron lumen diameter and 650 micron outside diameter.

The resulting fiber had a wafer permeability of 68 ml/min/m at 95 kPa, 288 ml/min/m af 402 kPa, and 347 ml/min/m at 600 kPa, a mean pore size of 0.270 micron and 80.1% pores above 0.16 micron. The fiber was drawn at a take-up speed of 60 meters/minute. The pores were elongated in the direction parallel to the axis of the hollow fiber.

Other properties were substantially the same as those of Example 10.

Example 17

The procedure of Example 10 was repeated, with the following differences:

5.2 kg Hoechst polypropylene PPN1060F was dissolved in 14.6 kg TERIC N2 with 0.2 kg antioxidant Ethanox 330 and extruded at a temperature of 230° C. with soybean oil as the lumen, coating and quench fluids. The quench fluid temperature was 31.5° C.

The dimensions of the fiber were 310 micron lumen diameter and 599 micron outside diameter.

The resulting fiber had a water permeability of 52 ml/min/m at 96 kPa, 241 ml/min/m at 397 kPa, and 305 ml/min/m at 598 kPa, a mean pore size of 0.322 micron and 65.7% pores above 0.16 micron. The fiber was drawn at a take-up speed of 60 meters/minute. The pores were elongated in the direction parallel to the axis of the hollow fiber.

Other properties were substantially the same as those of Example 10.

Example 18

The procedure of Example 10 was repeated, with the following differences:

5.2 kg Shell polypropylene LY6100 was dissolved in a mixture of 9.8 kg soybean oil and 4.6 kg castor oil with 0.2 kg antioxidant Ethanox 330 and extruded at a temperature of 195° C. with soybean oil as the lumen, coating and quench fluids. The quench fluid temperature was 26.2° C.

The nominal dimensions of the fiber were 320 micron lumen diameter and 650 micron outside diameter.

The resulting fiber had a bubble point of 175 kPa, a mean pore size of 0.3 micron and 87.4% pores above 0.16 micron. The fiber was drawn af a take-up speed of 60 meters/minute. The pores were elongated in the direction parallel to the axis of the hollow fiber.

Other properties were substantially the same as those of Example 10.

Example 19

The procedure of Example 10 was repeated, with the following differences:

5.2 kg Hoechst polypropylene PPR1070 was dissolved in a mixture of 9.8 kg soybean oil and 4.6 kg castor oil with 0.2 kg antioxidant Ethanox 330 and extruded af a temperature of 197° C. with soybean oil as the lumen, coating and quench fluids. The quench fluid temperature was 26.0° C.

The nominal dimensions of the fiber were 320 micron lumen diameter and 650 micron outside diameter.

The resulting fiber had a bubble point of 133 kPa, a mean pore size of 0.45 micron and 100.0% pores above 0.16 micron. The fiber was drawn at a take-up speed of 60 meters/minute. The pores were elongated in the direction parallel to the axis of the hollow fiber.

Other properties were substantially the same as those of Example 10.

Example 20

The procedure of Example 10 was repeated, with the following differences:

5.2 kg Hoechst polypropylene PPR1060F was dissolved in a mixture of 10.8 kg soybean oil and 5.0 kg castor oil and extruded at a temperature of 186° C. with soybean oil as the lumen, coating and quench fluids. The quench fluid temperature was 27.5° C.

The nominal dimensions of the fiber were 320 micron lumen diameter and 650 micron outside diameter.

The resulting fiber had a bubble point of 245 kPa, a mean pore size of 0.19 micron and 86.2% pores above 0.16 micron. The fiber was drawn at a take-up speed of 60 meters/minute. The pores were elongated in the direction parallel to the axis of the hollow fiber.

Other properties were substantially the same as those of Example 10.

Example 21

The procedure of Example 10 was repeated, with the following differences:

5.2 kg Hoechst polypropylene PPN1070 was dissolved in 14.6 kg TERIC N2 with 0.2 kg antioxidant Ethanox 330 and extruded at a temperature of 196° C. with soybean oil as the lumen, coating and quench fluids. The quench fluid temperature was 25.4° C.

The nominal dimensions of the fiber were 320 micron lumen diameter and 650 micron outside diameter.

The resulting fiber had a bubble point of 140 kPa, a mean pore size of 0.24 micron and 89.6% pores above 0.16 micron. The fiber was drawn at a take-up speed of 60 meters/minute. The pores were elongated in the direction parallel to the axis of the hollow fiber.

Other properties were substantially the same as those of Example 10.

Example 22

The procedure of Example 10 was repeated, with the following differences: 4.8 kg Hoechst polypropylene PPN1070 was dissolved in 15.0 kg TERIC N2 with 0.2 kg antioxidant Ethanox 330 and extruded at a temperature of 198° C. with soybean oil as the lumen, coating and quench fluids. The quench fluid temperature was 20.7° C.

The nominal dimensions of the fiber were 320 micron lumen diameter and 650 micron outside diameter.

The resulting fiber had a bubble point of 175 kPa, a mean pore size of 0.23 micron and 82.8% pores above 0.16 micron. The fiber was drawn at a take-up speed of 60 meters/minute. The pores were elongated in the direction parallel to the axis of the hollow fiber.

Other properties were substantially the same as those of Example 10.

Example 23

The procedure of Example 10 was repeated, with the following differences:

5.2 kg Hoechst polypropylene PPN1060F was dissolved in 14.6 kg TERIC N2 with 0.2 kg antioxidant Ethanox 330 and extruded at a temperature of 238° C. with soybean oil as the lumen, coating and quench fluids. The quench fluid temperature was 21.4° C.

The nominal dimensions of the fiber were 320 micron lumen diameter and 650 micron outside diameter.

The resulting fiber had a bubble point of 280 kPa, a mean pore size of 0.18 micron and 83.4% pores above 0.16 micron. The fiber was drawn at a fake-up speed of 60 meters/minute. The pores were elongated in the direction parallel of the axis of the hollow fiber.

Other properties were substantially the same as those of Example 10.

Example 24

The procedure of Example 10 was repeated, with the following differences:

5.2 kg Shell polypropylene LY6100 was dissolved in 14.6 kg TERIC N2 with 0.2 kg antioxidant Ethanox 330 and extruded af a temperature of 190° C. with dioclphthalate as the lumen, coating and quench fluids. The quench fluid temperature was 26.5° C. The nominal dimensions of the fiber were 320 micron lumen diameter and 650 micron outside diameter.

The resulting fiber had a bubble point of 310 kPa a mean pore size of 0.24 micron and 79% pores above 0.16 micron. The fiber was drawn at a take-up speed of 60 meters/minute. The pores were elongated in the direction parallel to the axis of the hollow fiber.

Other properties were substantially the same as those of Example 10.

Example 25

The procedure of Example 10 was repeated, with the following differences:

350 g Hoechst polypropylene PPN1060F was dissolved in a mixture of 100 g castor oil and 550 g dioctyphthalate with 1 gram antioxidant Ethanox 330 and extruded af a temperature of 190° C. with a mixture of dioctylphthalafe and castor oil as the lumen and coating fluids and dioctyphthalate as the quench fluid. The quench fluid temperature was 28.9° C.

The nominal dimensions of the fiber were 320 micron lumen diameter and 650 micron outside diameter and had a microporous structure. The fiber was drawn at a take-up speed of 60 meters/minute. The pores were elongated in the direction parallel to the axis of the hollow fiber. Other properties were substantially the same as those of Example 10.

Example 26

The procedure of Example 10 was repeated, with the following differences:

300 g Hoechst polypropylene PPN1060F was dissolved in a mixture of 450 gram oleic acid and 250 g of the dimer acid Pripol 1017 from Unichem with 1 gram antioxidant Ethanox 330 and extruded at a temperature of 190° C. with oleic acid as the lumen and coating fluids and a mixture of ethyl cellulose and water with a viscosity of 560 centipoise as the quench fluid. The quench fluid temperature was 32° C.

The nominal dimension of the fiber were 320 micron lumen diameter and 650 micron outside diameter and had a microporous structure. The fiber was drawn at a take-up speed of 60 meters/minute. The pores were elongated in the direction parallel to the axis of the hollow fiber.

Other properties were substantially the same as those of Example 10.

Example 27

The procedure of Example 10 was repeated, with the following differences:

525 g Hoechst polypropylene PPN1060F was dissolved in 975 g castor-oil with 1.5 g antioxidant Ethanox 330 and extruded at a temperature of 190° C. with dioctylphthalate as the lumen, coating and quench fluids. The quench fluid temperature was gradually increased from 25° C. to 33° C.

The nominal dimensions of the fiber were 320 micron lumen diameter and 650 micron outside diameter and had a microporous structure. The fiber was drawn at a take-up speed of 60 meters/minute. The pores were elongated in the direction parallel to the axis of the hollow fiber.

Other properties were substantially the same as those of Example 10.

Example 28

The procedure of Example 10 was repeated, with the following differences:

450 g Hoechst polypropylene PPN1060F was dissolved in 1.05 kg dibutylphthalate with 1.5 g antioxidant Ethanox 330 and extruded at a temperature which gradually rose from 200° C. to 230° C. with dibutylphthalate as the lumen, coating and quench fluids. The quench fluid temperature was gradually increased from 25° C. to 33° C.

The nominal dimensions of the fiber were 320 micron lumen diameter and 650 micron outside diameter and had a microporous structure. The fiber was drawn at a take-up speed of 60 meters/minute. The pores were elongated in the direction parallel to the axis of the hollow fiber.

Other properties were substantially the same as those of Example 10.

Example 29

The procedure of Example 10 was repeated, with the following differences:

500 g Hoechst polypropylene PPN1060F was dissolved in a mixture of 350 g dioctylphthalate and 1050 g dibutylphthalate with 10 kg antioxidant Ethanox 330 and extruded at a temperature of 230° C. with dioctylphthalate as the lumen and coating fluids and 99% dibutylphthalate and 1% dioctylphthalate as quench fluid. The quench fluid temperature was 32.6° C.

The nominal dimensions of the fiber were 320 micron lumen diameter and 650 micron outside diameter.

The resulting fiber had a bubble point of 460 kPa, a mean pore size of 0.10 micron and 15% pores above 0.16 micron. The fiber was drawn at a take-up speed of 60 meters/minute. The pores were elongated in the direction parallel to the axis of the hollow fiber.

Other properties were substantially the same as those of Example 10.

Example 30 to 40

The procedure of Example 10 was repeated, with the following differences:

For each example, a mixture of polyvinylidene fluoride (PVDF), glycerol triacetate (GTA), diethylene glycol (DEG), and 0.01% 1,3,5-trimethyl-2,4,6-tris-(3,5-di-tert-butyl-4-hydroxybenzyl) benzene antioxidant (Ethanox 330) was mixed while heating under partial vacuum to a temperature of 220° C. to form a homogeneous dope. The dopes were extruded, to produce hollow fiber membranes having the properties set out in Table 2. The drawing parameters are set out in the following Table 1.

TABLE 1

| Example | Extrusion Rate | Take-up Rate | Draw Ratio |
|---|---|---|---|
| 30 | 5.8 | 60 | 10.3 |
| 31 | 5.8 | 60 | 10 |
| 32 | 6.7 | 60 | 9 |
| 33 | 3.67 | 40 | 9 |
| 34 | 6.7 | 60 | 9 |
| 35 | 6.7 | 60 | 9 |
| 36 | 6.7 | 60 | 9 |
| 37 | 5.8 | 60 | 10.3 |
| 38 | 5.8 | 60 | 10.3 |
| 39 | 5.8 | 60 | 10.3 |
| 40 | 5.8 | 60 | 10.3 |

What is claimed is:

1. A hollow fiber spinodal decomposition polymer membrane having an outer surface, and inner surface enclosing a lumen, and a continuous network of interconnecting pores extending from said outer surface to said inner surface, wherein substantially all of said pores have an elongated dimension and a shortened dimension, said elongated dimension being oriented substantially parallel to the axis of said hollow fiber, wherein the ratio of said elongated dimension to said shortened dimension is substantially constant from said outer surface to said inner surface, and wherein said pores elastically change shape to increase said shortened dimension in response to a high pressure differential imposed across said membrane by increasing fluid pressure within said lumen, wherein said membrane is the product of the process comprising the steps of:

A. forming a solution of a polymer in a vehicle which is a solvent for said polymer at a first condition and a non-solvent for said polymer at a second condition;

B. extruding said solution in hollow fiber form at said first condition;

C. changing the conditions of said solution from said first condition to said second condition cooling said solution to solidify said polymer into a porous membrane while drafting said hollow fiber form at a rate sufficient to axially elongate the pores in a direction parallel to the axis of the forming hollow fiber, wherein said change of condition is conducted at a rate to effect precipitation within an interval shorter than the syneresis relaxation time of said elongated pores.

TABLE 2

| | SOLVENT SYSTEM | | | COMPOSITION OF OTHER STEAMS | | | OPERATING TEMPERATURES | |
|---|---|---|---|---|---|---|---|---|
| EXAMPLE | % PVDF | % GTA | % DEG | LUMEN | COATING | QUENCH | DOPE EXTRUSION | QUENCH TEMP |
| 21 | 30.00 | 30.0 | 39.9 | DEG | 90 DEG, 10 GTA | DEG | 215 | 67 |
| 22 | 35.00 | 30.0 | 34.9 | DEG | 91 DEG, 10 GTA | DEG | 215 | 47 |
| 23 | 11.75 | 30.0 | 46.4 | DEG | 92 DEG, 10 GTA | DEG | 220 | 30 |
| 24 | 11.75 | 30.0 | 46.4 | DEG | 93 DEG, 10 GTA | DEG | 220 | 30 |
| 25 | 11.75 | 30.0 | 46.4 | DEG | 94 DEG, 10 GTA | DEG | 220 | 30 |
| 26 | 11.75 | 30.0 | 46.4 | DEG | 95 DEG, 10 GTA | DEG | 210 | 30 |
| 27 | 12.50 | 30.0 | 44.9 | DEG | 96 DEG, 10 GTA | DEG | 220 | 28 |
| 28 | 30.00 | 30.0 | 39.9 | DEG | 97 DEG, 10 GTA | DEG | 210 | 60 |
| 29 | 11.25 | 30.0 | 47.4 | DEG | 98 DEG, 10 GTA | DEG | 220 | 30 |
| 30 | 11.25 | 30.0 | 47.4 | DEG | 99 DEG, 10 GTA | DEG | 220 | 29 |
| 31 | 11.25 | 30.0 | 47.4 | DEG | 100 DEG, 10 GTA | DEG | 220 | 30 |

| | FLOW RATES | | | | TAKE-UP | MEAN | WATER |
|---|---|---|---|---|---|---|---|
| EXAMPLE | DOPE | LUMEN | COATING | QUENCH | RATE | PORE SIZE | PERMEABILITY |
| 21 | 20 | 6 | 15 | 800 | 60 | 0.30 | 141 |
| 22 | 15 | 6 | 11 | 800 | 60 | 0.21 | 76 |
| 23 | 23 | 6 | 8 | 300 | 60 | 0.29 | 170 |
| 24 | 15 | 4 | 8 | 300 | 60 | 0.24 | 135 |
| 25 | 23 | 6 | 8 | 300 | 60 | 0.37 | 262 |
| 26 | 23 | 6 | 8 | 300 | 60 | 0.30 | 183 |
| 27 | 23 | 7 | 10 | 500 | 60 | 0.28 | 160 |
| 28 | 20 | 6 | 15 | 700 | 60 | 0.51 | 306 |
| 29 | 23 | 6 | 8 | 300 | 60 | 0.38 | 198 |
| 30 | 23 | 6 | 15 | 500 | 60 | 0.25 | 82 |
| 31 | 23 | 6 | 15 | 500 | 60 | 0.29 | 141 |

2. The hollow fiber membrane of claim 1 wherein said vehicle is a cationic or non-ionic surfactant having a hydrophilic-lipophilic balance range of 4.0 to 6.0.

3. The hollow fiber membrane of claim 2 wherein said vehicle is a member selected from the group consisting of nonylphenoxypolyethylene glycols, ethyloxylated derivatives of cetyl-oleyl alcohol, condensates of ethylene oxide with tall off, self-emulsifying derivatives from high molecular weight fatty adds, sorbitan monooleate, sorbitan monostearate, sorbitan sesquioleate, polyoxyethylene hexitan fatty acid ester, polyoxyethylene cetyl oleyl alcohol, polyoxyethylene-alcohol diester, polyoxyethylene-stearyl alcohol diester, polyoxyethylene-fatty alcohol diesters, polyoxyethylene-synthetic primary $C_{13}$ to $C_{15}$ alcohol diesters, and mixtures thereof.

4. The method of making a hollow fiber membrane of claim 4 wherein said first condition is a solution temperature above the miscibility temperature of said polymer and said vehicle, said second condition is a temperature below the miscibility temperature of said polymer and said solvent, and said change of condition is cooling.

5. The method of making a hollow fiber membrane of claim 1 wherein said first condition is a vehicle composition in which said polymer is soluble, said second condition is a vehicle composition in which said polymer is insoluble, and said change of condition is the addition of a material which changes said vehicle composition.

6. The hollow fiber membrane of claim 1 wherein said polymer is a member selected from the group consisting of polypropylene, polybutylene, polyvinylidene dichloride, polyamide, polyvinyl chloride, polystyrene, polymethylmethacrylate, polyphenylene oxide, polyethylene terephthalate, polyacrylonitrile, polysulfone, polyether sulfone and cellulose acetate.

7. The hollow fiber membrane of claim 1 wherein said polymer is polypropylene.

8. The hollow fiber membrane of claim 1 wherein said polymer is polyvinylidene fluoride.

* * * * *

UNITED STATES PATENT AND TRADEMARK OFFICE
CERTIFICATE OF CORRECTION

PATENT NO. : 5,698,101
DATED : December 16, 1997
INVENTOR(S) : Kopp, Streeton, and Khoo It is certified that error appears in the above-indentified patent and that said Letters Patent is hereby corrected as shown below:

At column 29, in Claim 4, lines 1 and 2, the recitation "The method of making a hollow fiber membrane of claim 4" is corrected to read -- The hollow fiber membrane of claim 1--

At column 30, in claim 5, line 1, the recitation "The method of making a hollow fiber membrane" is corrected to read -- The hollow fiber membrane --

Signed and Sealed this

Eighteenth Day of August, 1998

Attest:

BRUCE LEHMAN

*Attesting Officer*  *Commissioner of Patents and Trademarks*